(12) United States Patent
Kim

(10) Patent No.: US 9,111,576 B2
(45) Date of Patent: Aug. 18, 2015

(54) APPARATUS AND METHOD FOR PREFETCHING DATA

(75) Inventor: Ki Woong Kim, Gunpo-si (KR)

(73) Assignee: Seagate Technology LLC, Cupertino, CA (US)

( * ) Notice: Subject to any disclaimer, the term of this patent is extended or adjusted under 35 U.S.C. 154(b) by 169 days.

(21) Appl. No.: 13/459,045

(22) Filed: Apr. 27, 2012

(65) Prior Publication Data

US 2013/0031306 A1 Jan. 31, 2013

(30) Foreign Application Priority Data

Apr. 27, 2011 (KR) .................. 10-2011-0039714

(51) Int. Cl.
G06F 12/00 (2006.01)
G06F 13/00 (2006.01)
G06F 13/28 (2006.01)
G11B 20/10 (2006.01)
G06F 12/08 (2006.01)

(52) U.S. Cl.
CPC ...... G11B 20/10527 (2013.01); G06F 12/0862 (2013.01); *G06F 2212/6028* (2013.01); *G11B 2020/10657* (2013.01); *G11B 2020/10685* (2013.01); *G11B 2220/2516* (2013.01)

(58) Field of Classification Search
CPC .............. G11B 20/10527; G11B 2020/10657; G11B 2020/10685; G11B 2220/2516; G06F 12/0862; G06F 2212/6028
USPC .................................................. 711/113, 137
See application file for complete search history.

(56) References Cited

U.S. PATENT DOCUMENTS

| 7,440,221 | B2 | 10/2008 | Tsuchinaga | |
|---|---|---|---|---|
| 7,982,994 | B1 | 7/2011 | Erden | |
| 8,179,627 | B2 | 5/2012 | Chang | |
| 8,249,351 | B2 * | 8/2012 | Ozawa et al. | 382/181 |
| 8,270,256 | B1 | 9/2012 | Juang | |
| 8,429,351 | B1 * | 4/2013 | Yu et al. | 711/132 |
| 8,443,167 | B1 * | 5/2013 | Fallone et al. | 711/206 |
| 2006/0143426 | A1 * | 6/2006 | Wu | 711/203 |
| 2007/0030588 | A1 | 2/2007 | Tsuchinaga | |

(Continued)

OTHER PUBLICATIONS

Garth Gibson, Directions for Shingled-Write and Two-Dimensional Magnetic Recording System Architectures: Synergies with Solid-State Disks, Carnegie Mellon University, May 2009,pp. 1-2, Pittsburgh, US.

*Primary Examiner* — Charles Rones
*Assistant Examiner* — Sidney Li
(74) *Attorney, Agent, or Firm* — Cesari & Reed LLP; Kirk A. Cesari; Christian W. Best

(57) ABSTRACT

Apparatuses and methods for prefetching data are disclosed. A method may include receiving a read request at a data storage device, determining a meta key in an address map that includes a logical block address (LBA) of the read request, wherein the meta key includes a beginning LBA and a size field corresponding to a number of consecutive sequential LBAs stored on the data storage device, calculating a prefetch operation to prefetch data based on addresses included in the meta key, and reading data corresponding to the prefetch operation and the read request. An apparatus may include a processor configured to receive a read request, determine a first meta key and a second meta key in an address map, calculate a prefetch operation based on addresses included in the first meta key and the second meta key, and read data corresponding to the prefetch operation and the read request.

20 Claims, 24 Drawing Sheets

(56) References Cited

U.S. PATENT DOCUMENTS

| | | |
|---|---|---|
| 2009/0198965 A1* | 8/2009 | Arimilli et al. ............... 712/207 |
| 2011/0058277 A1* | 3/2011 | de la Fuente et al. ......... 360/122 |
| 2011/0085266 A1 | 4/2011 | Kanai |
| 2011/0222186 A1 | 9/2011 | Itakura |
| 2011/0292545 A1 | 12/2011 | Katada |
| 2012/0060073 A1 | 3/2012 | Itakura |
| 2012/0069466 A1 | 3/2012 | Okamoto |
| 2012/0082019 A1 | 4/2012 | Harigae |
| 2012/0099216 A1 | 4/2012 | Grobis |
| 2012/0162808 A1 | 6/2012 | Masuda |
| 2012/0194937 A1 | 8/2012 | Tagami |

\* cited by examiner

| LB NO | VB NO | LA VA |
|---|---|---|
| 0 | 2 | 199 |
| | 0 | 94 |
| 1 | | |
| 2 | 3 | 130 |
| 3 | 7 | 199 |
| | 1 | 155 |
| ⋮ | ⋮ | ⋮ |
| K-1 | | |
| K | K | 199 |
| | Q | 45 |

FIG. 20

APPARATUS AND METHOD FOR PREFETCHING DATA

CROSS-REFERENCE TO RELATED APPLICATIONS

This application claims priority under 35 U.S.C. §119(a) of Korean Patent Application No. 2011-0039714, filed on Apr. 27, 2011, the entire disclosure of which is hereby incorporated by reference.

BACKGROUND OF THE INVENTION

1. Field of the Invention

This specification relates to a method and apparatus for reading data from a storage medium, and particularly, to a method and apparatus for reading data on a storage device which accesses a storage medium using address mapping information.

2. Background of the Invention

A disk drive as one of storage devices writes data on a storage medium or read data from the storage medium according to a command issued by a host device, so as to contribute to a computer system operation. Various writing schemes are being researched to improve recording (writing) density of the disk drive. Studies are also ongoing to improve an access performance of the disk drive.

SUMMARY OF THE INVENTION

In one embodiment, a method may comprise receiving a read request at a data storage device, determining a first meta key in an address map that includes a logical block address of the read request, wherein the first meta key includes a beginning logical block address and a size field corresponding to a number of consecutive sequential logical block addresses stored on the data storage device, calculating a prefetch operation to prefetch data based on addresses included in the first meta key, and reading data corresponding to the prefetch operation and the read request from the data storage device.

In another embodiment, an apparatus may comprise a computer-readable storage medium storing instructions that when executed by a computer cause the computer to perform a method comprising receiving a read request at a data storage device, determining a first meta key in an address map that includes a logical block address of the read request, wherein the first meta key includes a beginning logical block address and a size field corresponding to a number of consecutive sequential logical block addresses stored on the data storage device, calculating a prefetch operation to prefetch data based on addresses included in the first meta key, and reading data corresponding to the prefetch operation and the read request from the data storage device.

In another embodiment, an apparatus may comprise a processor configured to receive a read request to retrieve data from a nonvolatile storage memory, determine a first meta key in an address map that includes a start logical block address of the read request and a second meta key in the address map that includes an end logical block address of the read request, wherein meta keys include a beginning logical block address and a size field corresponding to a number of consecutive sequential logical block addresses stored on the nonvolatile storage medium, calculate a prefetch operation to prefetch data based on addresses included in the first meta key and the second meta key, and read data corresponding to the prefetch operation and the read request from the nonvolatile storage medium.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 20 illustrates one example of address mapping information indicating an allocated state of the virtual bands with respect to the logical band illustrated in FIG. 10;

DETAILED DESCRIPTION OF THE INVENTION

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinafter, description will be given in detail of the preferred exemplary embodiments according to the present disclosure with reference to the accompanying drawings.

Figure 1A:
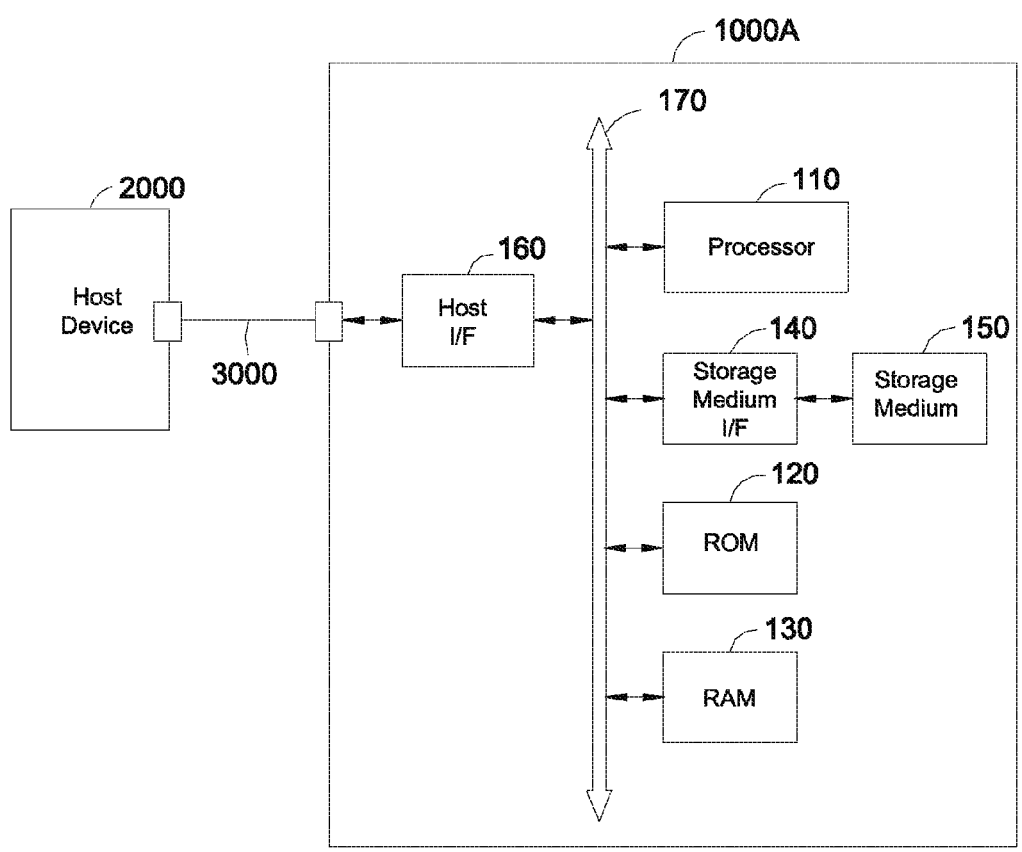
FIG. 1A is a block diagram of a computer system in accordance with one exemplary embodiment of the present disclosure.

As illustrated in FIG. 1A, a computer system according to one exemplary embodiment of the present disclosure may include a storage device 1000A, a host device 2000 and a connector 3000.

In detail, the storage device 1000A may include a processor 110, a Read-Only Memory (ROM) 120, a Random Access Memory (RAM) 130, a storage medium interface (I/F) 140, a storage medium 150, a host interface 160, and a bus 170.

The host device 2000 may issue a command for operating the storage device 1000A, and transmit the command to the storage device 1000A connected via the connector 3000 so as to perform a process of transmitting and receiving data to and from the storage device 1000A according to the issued command.

The connector 3000 is a unit for electrically connecting an interface port of the host device 2000 to an interface port of the storage device 1000A, and may include a data connector and a power source connector. As one example, for using a Serial Advanced Technology Attachment (SATA) interface, the connector 3000 may include a 7-pin SATA data connector and a 15-pin SATA power source connector.

Hereinafter, each component of the storage device 1000A will be described.

The processor 110 may serve to interpret commands and control elements (components) of the data storage device according to the interpretation result. The processor 110 may include a code object management unit. The processor 110 may load code objects, which are stored in the storage medium 150, into the RAM 130 using the code object management unit. The processor 110 may load into the RAM 130 code objects for executing methods according to flowcharts illustrated in FIGS. 15 to 19 and FIG. 31.

The processor 110 may execute tasks for the methods according to the flowcharts illustrated in FIGS. 15 to 19 and FIG. 31 using the code objects loaded to the RAM 130. A data reading method and a prefetch management method in a data read operation through a network, which are executed by the processor 110, will be explained in detail with reference to FIGS. 15 to 19 and FIG. 31.

The ROM 120 may store program codes and data which are necessary to operate the data storage device.

The program codes and the data stored in the ROM 120 or the storage medium 150 may be loaded into the RAM 130 according to the control by the processor 110.

The storage medium 150 may include a disk or a non-volatile semiconductor memory device as a main storage medium of the storage device. The storage device may include, for example, a disk drive. A detailed construction of a head disk assembly 100 having a disk and a head in a disk drive is illustrated in FIG. 3.

Figure 3:
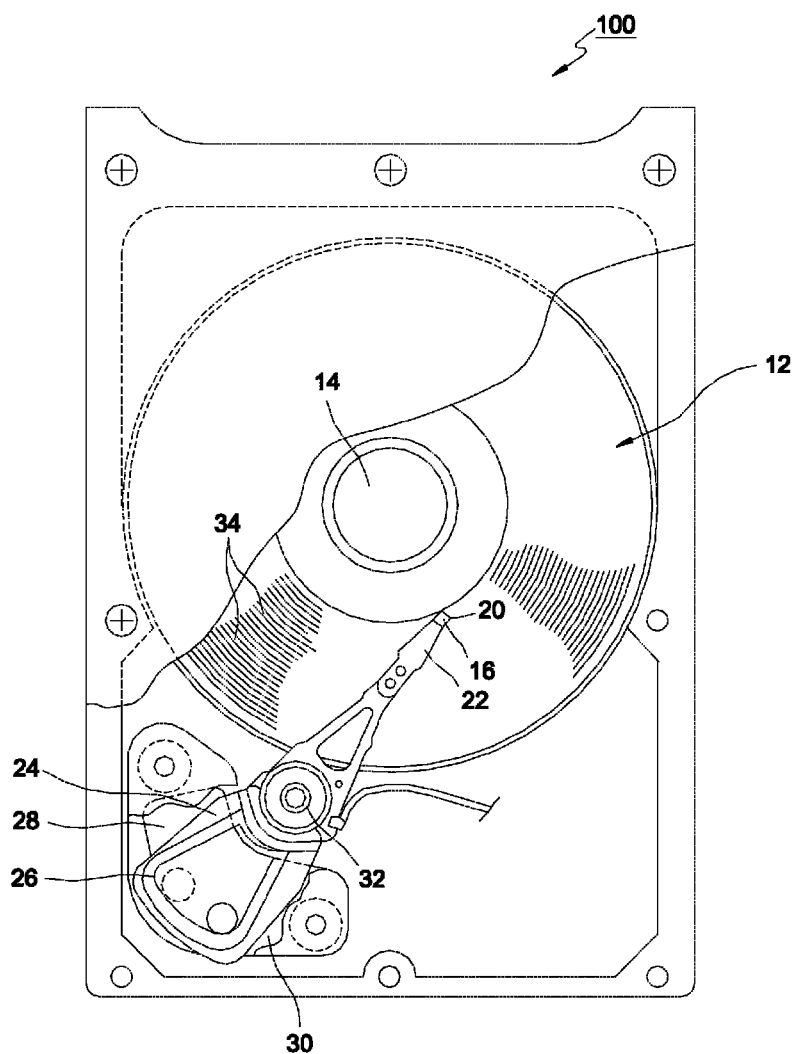
FIG. 3 is a planar view of a head disk assembly of a disk drive in accordance with one exemplary embodiment.

Referring to FIG. 3, the head disk assembly 100 may include at least one disk 12 that is rotated by a spindle motor 14. The disk drive may further include a head 16 located adjacent to a surface of the disk 12.

The head 16 may sense a magnetic field of each disk 12 and magnetize the disk 12 to read or write information from or in the disk 12 as it rotates. Typically, the head 16 may be coupled to a surface of each disk 12. Although one head 16 is illustrated in FIG. 3, it should be understood that the head 16 includes a writing head for magnetizing the disk 12 and a separate reading head for sensing the magnetic field of the disk 12. The reading head may include a Magneto-Resistive (MR) device. The head 16 may also be referred to as a magnetic head or a transducer.

The head 16 may be integrated with a slider 20. The slider 20 may generate an air bearing between surfaces of the head 16 and the disk 12. The slider 20 may be coupled to a head gimbal assembly 22. The head gimbal assembly 22 may be attached onto an actuator arm 24 having a voice coil 26. The voice coil 26 may be located near a magnetic assembly 28 to define a Voice Coil Assembly (VCM). A current supplied to the voice coil 26 may generate torque for rotating the actuator arm 24 with respect to a bearing assembly 32. The rotation of the actuator arm 24 may move the head 16 across the surface of the disk 12.

Information may be stored in annular tracks of the disk 12. Each of the tracks 34 may include a plurality of sectors. A sector configuration for annular tracks is illustrated in FIG. 5.

Figure 5:
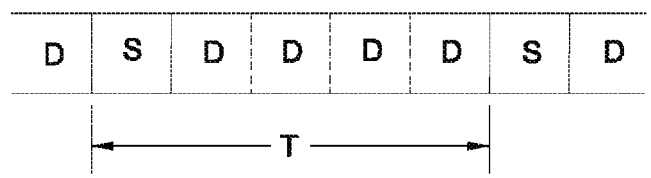
FIG. 5 is a view illustrating a sector architecture for one track of a disk as a storage medium applied to the present disclosure.

As illustrated in FIG. 5, one servo sector section T may include a servo information area S and a data area. The data area may include a plurality of data sectors D. Alternatively, one servo sector section may include a single data sector D. The data sector D may also be referred to as a sector. As one example, a size of the sector may be set to 512 bytes.

Figure 6:
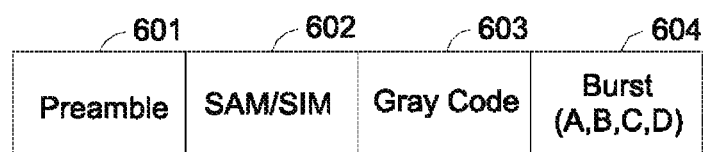
FIG. 6 is a view illustrating a structure of a servo information area illustrated in FIG. 5.

In the servo information area S may be recorded, in detail, signals as illustrated in FIG. 6.

Referring to FIG. 6, in the servo information area S may be written a preamble 601, a servo synchronization indication signal 602, a gray code 603 and a burst signal 604.

The preamble 601 may provide clock synchronization during reading of servo information. Also, the preamble 601 may provide a specific timing margin by forming a gap before a servo sector. The preamble 601 may also be used to determine a gain (not illustrated) of an Automatic Gain Control (AGC) circuit.

The servo synchronization indication signal 602 may include a Servo Address Mark (SAM) and a Servo Index Mark (SIM). The SAM is a signal indicating a start of a servo sector, and the SIM is a signal indicating a start of a first servo sector on a track.

The gray code 603 may provide track information. The burst signal 604 is used to control the head 16 to follow a middle part of the tracks 34. As one example, the burst signal 603 may include four patterns of A, B, C and D. That is, a position error signal for tracking control may be generated from a combination of the four burst patterns A, B, C and D.

The disk 12 may be divided into a maintenance cylinder area that is not accessible by a user, and a user data area that is net accessible by the user. The maintenance cylinder area may also be referred as a system area. Various types of information which are necessary to control a disk drive may be stored in the maintenance cylinder area. Of course, information required to perform a data reading method and a prefetch management method in a data read operation through a network according to this specification may also be stored in the maintenance cylinder area. Address mapping information may be stored in the maintenance cylinder area. The address mapping information may be used to convert a Logical Block Address (LBA) into a Virtual Address (VA) based on a virtual band. Here, the address mapping information may also be referred to as mapping table or metadata. The address mapping information may include meta keys which are information indicating a mapping state of physical addresses of the storage medium, which correspond to the LBAs.

The head 16 may be moved across the surface of the disk 12 to read information from or write information to other tracks. A plurality of code objects for enabling the disk drive to implement various functions may be stored in the disk 12. As one example, a code object for executing an MP3 player function, a code object for executing a navigation function, a code object for executing various video games and the like may be stored in the disk 12.

Referring back to FIG. 1A, the storage media interface 140 is a component to allow the processor 110 to access the storage medium 150 so as to read or write information. The storage medium interface 140 in the storage device which takes the form of a disk drive may include in detail a servo circuit for control of the head disk assembly 100, and a read/write channel circuit for processing a signal to read or write data.

The host interface 160 is a component for executing data transmission/reception to and from the host device 2000, such as a personal computer, a mobile terminal and the like. For example, the host interface 160 may employ various types of interfaces, such as Serial Advanced Technology Attachment (SATA) interface, Parallel Advanced Technology Attachment (PATA) interface, Universal Serial Bus (USB) interface and the like.

The bus 170 may serve to transfer information among those elements of the storage device.

Hereinafter, description will be given of a software operation system of a disk drive as one example of a storage device, with reference to FIG. 2.

Figure 2:
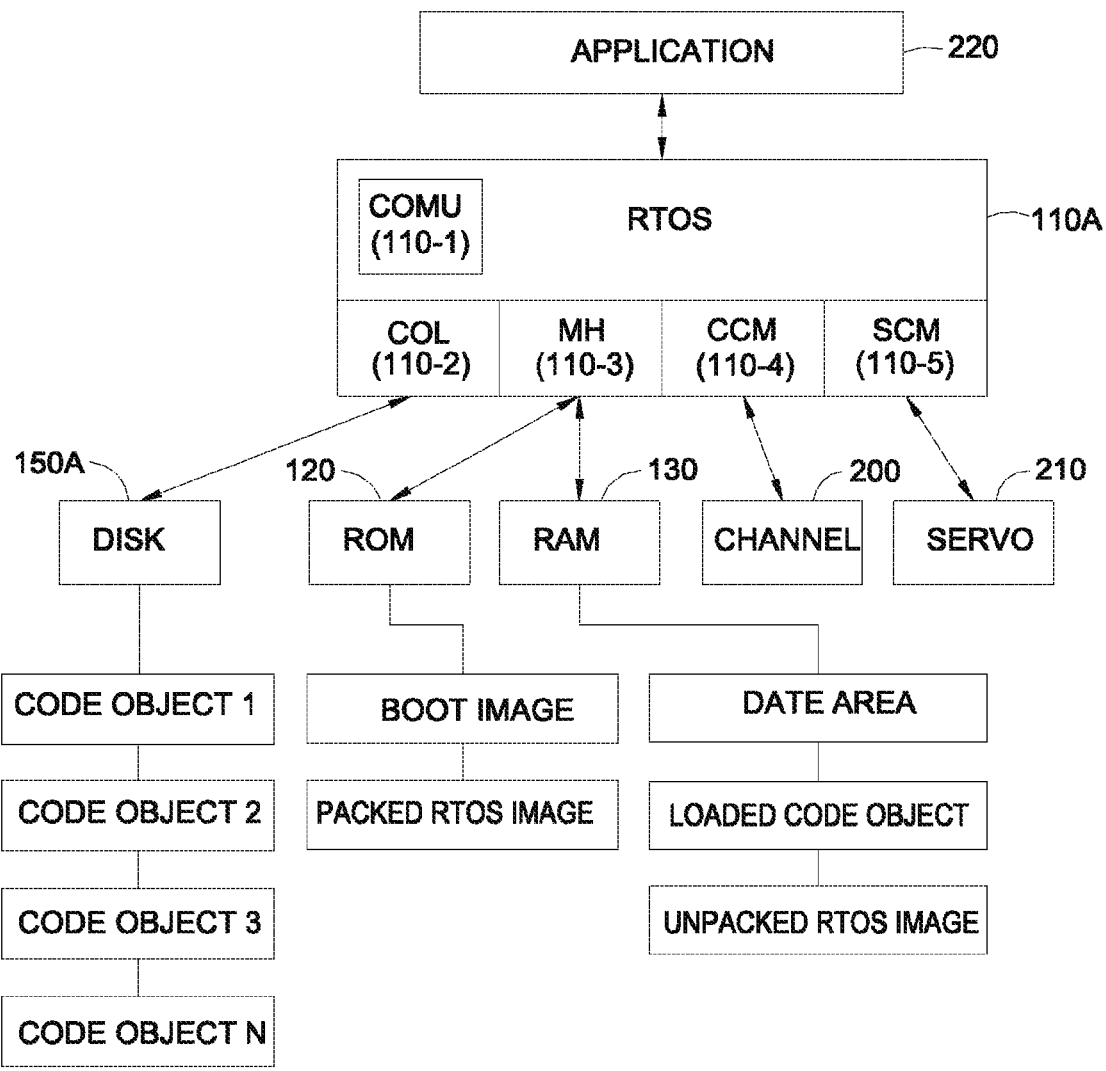
FIG. 2 illustrates a software operation system of a storage device in accordance with one exemplary embodiment.

As illustrated in FIG. 2, a disk 150A as a storage medium of a Hard Disk Drive (HDD) may store a plurality of code objects 1 to N.

The ROM 120 may store a boot image and a packed Real-Time Operating System (RTOS) image.

The disk 150A may store the plurality of objects 1 to N. The code objects stored in the disk 150A may include not only code objects for operating the disk drive but also code objects for performing various extendable functions of the disk drive. Especially, the disk 150A may store code objects for executing the methods according to flowcharts illustrated in FIGS. 15 to 19 and FIG. 31. The code objects for executing the methods according to the flowcharts illustrated in FIGS. 15 to 19 and FIG. 31 may alternatively be stored in the ROM 120, instead of the disk 150A. In addition, the disk 150A may also store code objects for executing various functions, such as a MP3 player function, a navigation function, a video game function and the like.

An unpacked RTOS image obtained by reading a boot image from the ROM 120 during booting may be loaded to the RAM 130. In addition, code objects, which are stored in the disk 150A and necessary to execute the host interface, may be loaded to the RAM 130. The address mapping information stored in the storage medium 150 may be loaded to the RAM 130 during a booting process. Also, a cache buffer area may be allocated to the RAM 130. Accordingly, data read out of the storage medium 150 may be temporarily stored in the cache buffer area. The cache buffer may be implemented as a memory device separate from the RAM 130.

Circuits required for processing signals to read or write data may be installed in a channel circuit 200. Also, circuits for controlling the head disk assembly 100 to read or write data may be installed in a servo circuit 210.

A Real Time Operating System (RTOS) 110A is a multi-program operating system using a disk. Depending on tasks, a real-time multiprocessing may be performed on a higher priority foreground task, and a batch processing may be performed on a lower priority background task. In addition, the RTOS 110A may load code objects from the disk and unload code objects to the disk.

The RTOS 110A may manage a Code Object Management Unit (COMU) 110-1, a Code Object Loader (COL) 110-2, a Memory Handler (MH) 110-3, a Channel Control Module (CCM) 110-4 and a Servo Control Module (SCM) 110-5 to execute tasks according to requested commands. The RTOS 110A may also manage application programs 220.

In detail, the RTOS 110A may load code objects, which are necessary to control a disk drive, to the RAM 130 when the disk drive is booted. Therefore, after booting, the disk drive may be operated using the code objects loaded to the RAM 130.

The COMU 110-1 may store position information where the code objects are written, and perform a bus arbitration process. The COMU 110-1 may also store information related to priorities of tasks being executed, and manage Task Control Block (TCB) information and stack information, required for executing tasks regarding the code objects.

The COL 110-2 may load the code objects stored in the disk 150A to the RAM 130 using the COMU 110-1, or unload the code objects stored in the RAM 130 to the disk 150A. Accordingly, the COL 110-2 may load the code objects, which are stored in the disk 150A and required for executing the methods according to the flowcharts of FIGS. 15 to 19 and FIG. 31, to the RAM 130.

The RTOS 110A may execute the methods according to the flowcharts illustrated in FIGS. 15 to 19 and FIG. 31, which will be explained later, using the code objects loaded to the RAM 130.

The MH 110-3 may write data to or read data from the ROM 120 and the RAM 130.

The CCM 110-4 may perform channel controlling required for processing a signal to write or read data, and the SCM 110-5 may control a servo system including the head disk assembly 100 for reading/writing data.

Figure 1B:
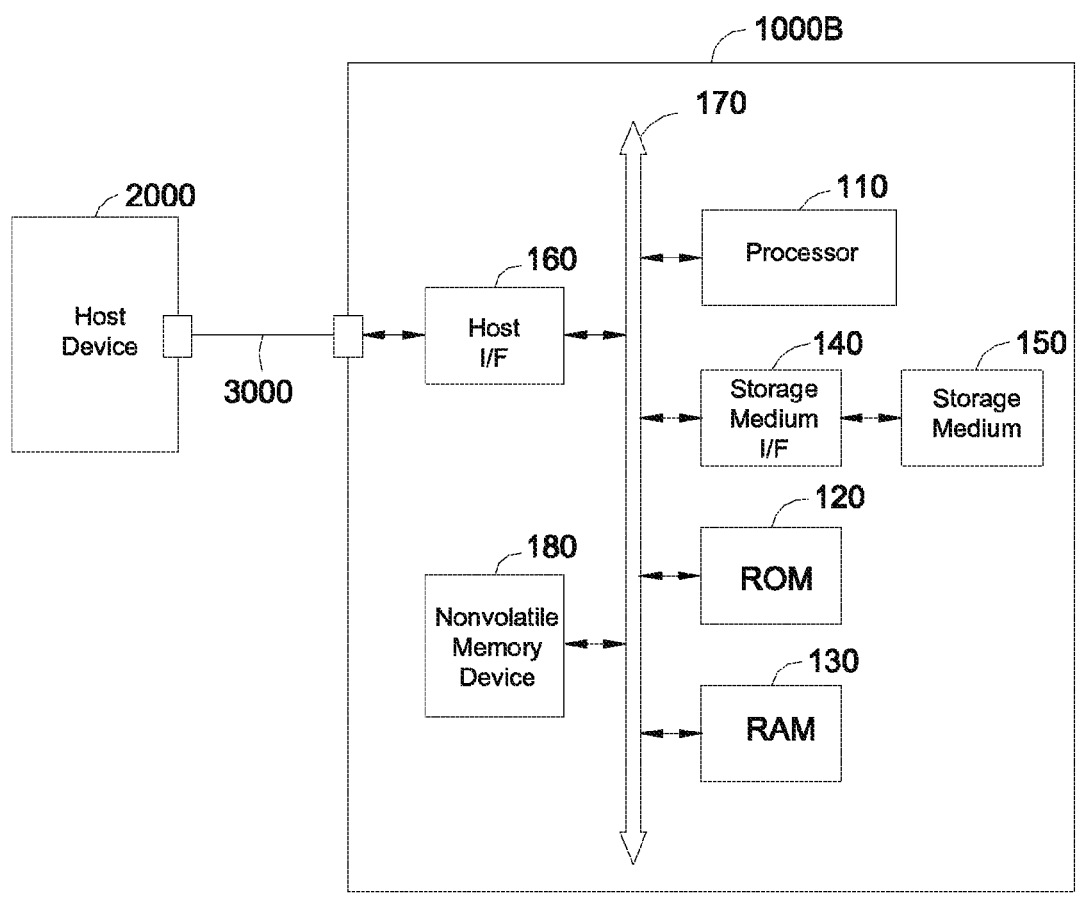
FIG. 1B is a block diagram of a computer system in accordance with another exemplary embodiment.

Next, FIG. 1B illustrates a configuration of a computer system in accordance with another exemplary embodiment of the present disclosure.

As illustrated in FIG. 1B, a storage device 1000B of a computer system may further include a non-volatile memory device 180 in the storage device 1000A illustrated in FIG. 1A. The storage medium 150 of FIG. 1B may be implemented as a disk.

The non-volatile memory device 180 may be implemented as a non-volatile semiconductor memory device, for example, a flash memory, a Phase Change RAM (PRAM), a Ferroelectric RAM (FRAM), a Magnetic RAM (MRAM) and the like.

The non-volatile memory device 180 may store part or all of data desired to store in the storage device 1000B. As one example, various information required for control of the storage device 1000B may be stored in the non-volatile memory device 180.

The non-volatile memory device 180 may store program codes and information required for executing the methods according to flowcharts of FIGS. 15 to 19 and FIG. 31. In detail, a mapping table for converting a logical block address into a virtual address based on a virtual zone or virtual band may be stored in the non-volatile memory device 180. Also, code objects for implementing various functions of the storage device may be stored in the non-volatile memory device 180. When the mapping table is stored in the non-volatile memory device 180, the storage device may load the mapping table stored in the non-volatile memory device 180 to the RAM 130.

The description of the same components which have been described in FIG. 1A will not be repeated.

Figure 4A:
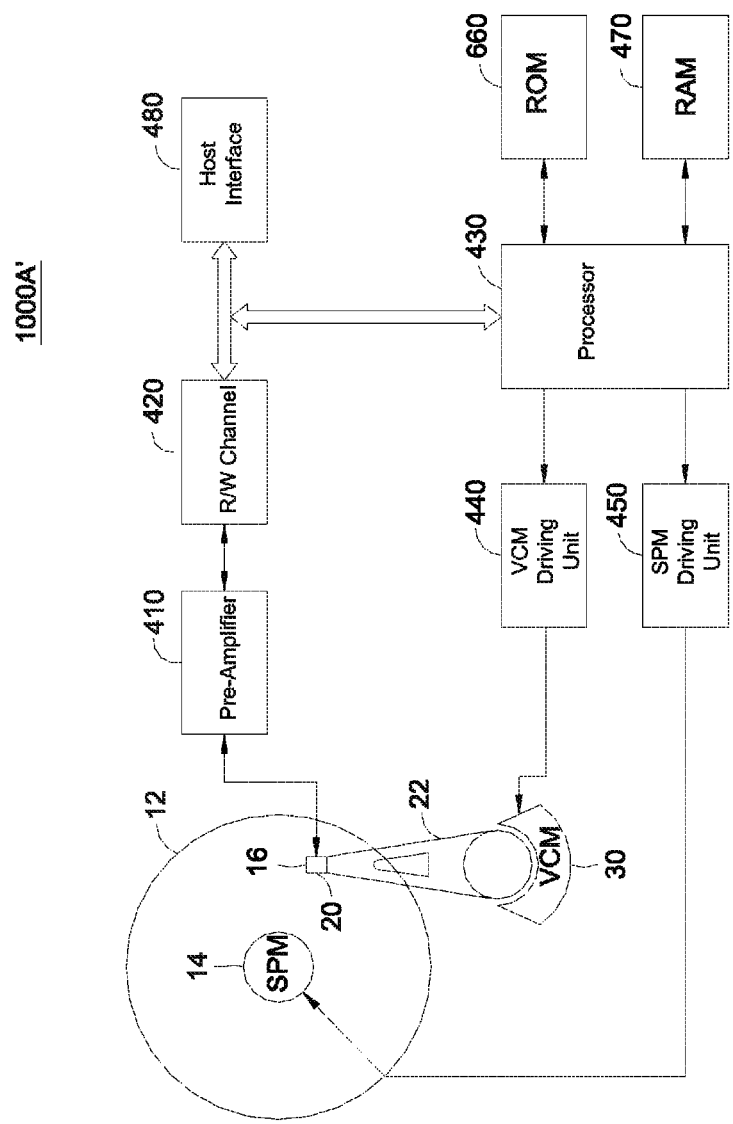
FIG. 4A is an electric configuration view of a disk drive in accordance with one exemplary embodiment.

Next, a structure of an electrical circuit of the disk drive 1000, which is an example of the storage device according to the one exemplary embodiment illustrated in FIG. 1A, is illustrated in FIG. 4A.

As illustrated in FIG. 4A, a disk drive 1000A' according to one exemplary embodiment of the present disclosure may include a pre-amplifier 410, a read/write (R/W) channel 420, a processor 430, a Voice Coil Motor (VCM) driving unit 440, a Spindle Motor (SPM) driving motor 450, a ROM 460, a RAM 470, and a host interface 480.

The processor 430 may be a Digital Signal Processor (DSP), a microprocessor, a microcontroller or the like. The processor 430 may control the R/W channel 420 to read information from or to write information to the disk 12 according to a command received from the host device 2000 via the host interface 480.

The processor 430 may be coupled to the VCM driving unit 440 which supplies a driving current to drive a VCM 30. The processor 430 may supply a control signal to the VCM driving unit 440 to control movement of the head 16.

The processor 430 may also be coupled to the SPM driving unit 450 which supplies a driving current to drive the SPM 14. When power is supplied, the processor 430 may supply a control signal to the SPM driving motor 450 to rotate the SPM 14 at a target speed.

The processor 430 may be coupled to the ROM 460 and the RAM 470, respectively. The ROM 460 may store firmware and control data for control of the disk drive. The ROM 460 may also store program codes and information for executing the methods according to the flowcharts illustrated in FIGS. 15 through 19 and FIG. 31. Alternatively, the program codes and information for executing the methods according to the flowcharts illustrated in FIGS. 15 through 19 and FIG. 31 may be stored in a maintenance cylinder area of the disk 12, instead of the ROM 460.

Under the control of the processor 430, the program codes stored in the ROM 460 or the disk 12 may be loaded to the RAM 470 in an initialization mode, and data received via the host interface 480 or data read out of the disk 12 may be temporarily stored in the cache buffer area. The cache buffer area may be allocated to another memory device, in addition to the RAM 470, in the storage device.

The RAM 470 may be implemented as a DRAM or SRAM. Also, the RAM 470 may be designed to operate in a Single Data Rate (SDR) manner or a Double Data Rate (DDR) manner.

The processor 430 may control the disk drive to execute the methods according to the flowcharts illustrated in FIGS. 15 to 19 and FIG. 31 using the program codes and information stored in the ROM 460 or the maintenance cylinder area of the disk 12.

Figure 4B:
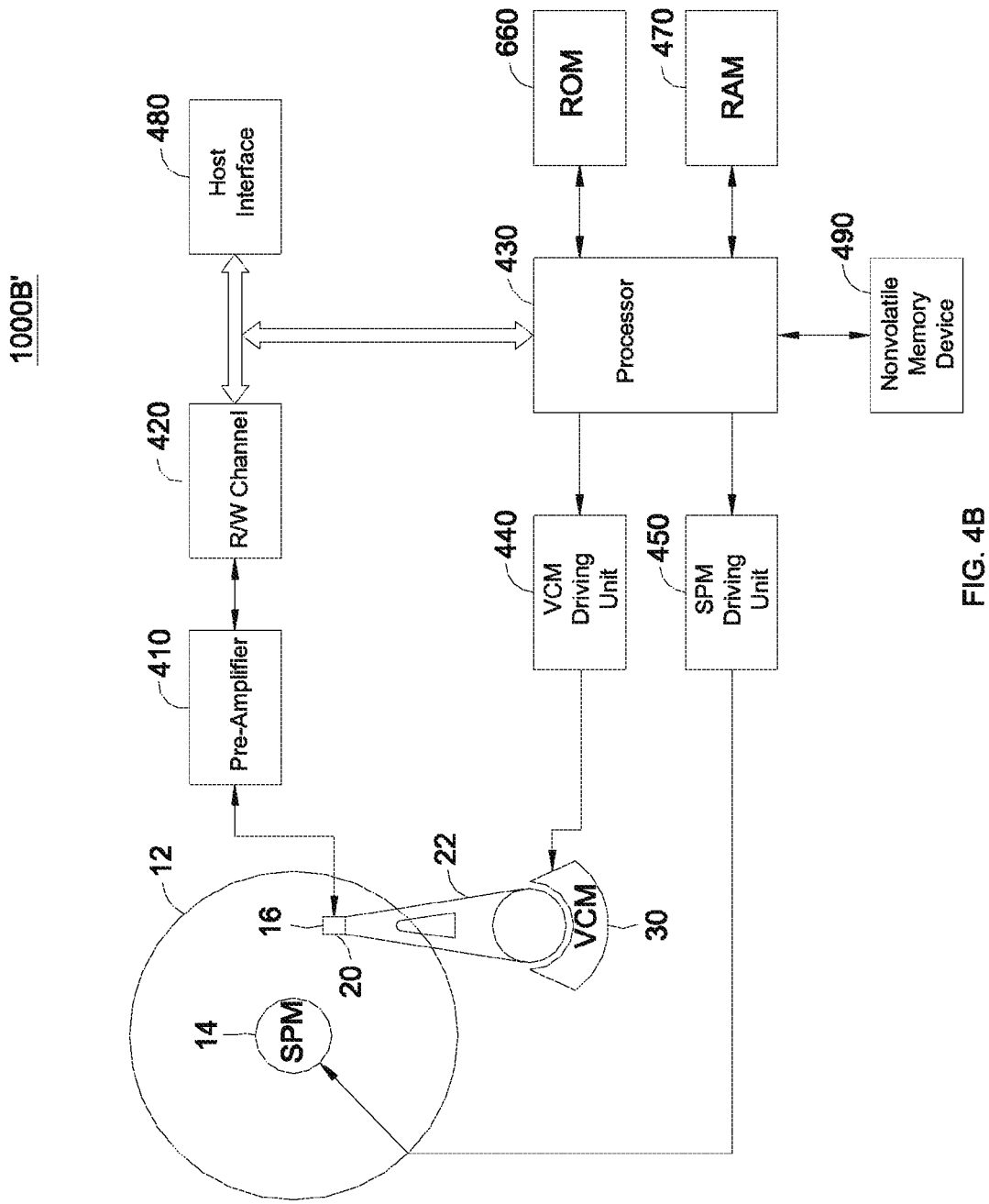
FIG. 4B is an electric configuration view of a disk drive in accordance with another exemplary embodiment.

Next, a structure of an electrical circuit of a disk drive 1000B', which is an example of the storage device according to the one exemplary embodiment illustrated in FIG. 1B, is illustrated in FIG. 4B.

As illustrated in FIG. 4B, the disk drive 1000B' may further include a non-volatile memory device 490 as compared with the disk drive 1000A' illustrated in FIG. 4A. The non-volatile memory device 490 may store a part of data desired to be stored in the disk drive 1000B'. For example, various types of information required for control of the disk drive 1000B' may be stored in the non-volatile memory device 490.

The non-volatile memory device 490 may store program codes and information required for executing the methods illustrated in FIGS. 15 to 19 and FIG. 31. In detail, a mapping table for converting a logical block address into a virtual address based on a virtual zone or virtual bend may be stored in the non-volatile memory device 180. Also, code objects for implementing various functions of the storage device may be stored in the non-volatile memory device 490.

The processor 430 may be coupled to the ROM 460, the RAM 470 and the non-volatile memory device 490, respectively. The ROM 460 may store firmware and control data for control of the disk drive. The ROM 460 may also store program codes and information for executing the methods according to the flowcharts illustrated in FIGS. 15 through 19 and FIG. 31. Alternatively, the program codes and information for executing the methods according to the flowcharts illustrated in FIGS. 15 through 19 and FIG. 31 may be stored in a maintenance cylinder area of the disk 12 or the non-volatile memory device 490, instead of the ROM 460.

Under the control of the processor 430, the program codes stored in the ROM 460, the disk 12 or the non-volatile memory device 490 may be loaded to the RAM 470 in an initialization mode.

The description of the same components which have been described in the disk drive 1000A' of FIG. 4A will not be repeated.

Hereinafter, description will be given of a data read operation and a data write operation which are executed after searching for a physical address of a disk, which corresponds to a logical block address defined by a read command or a write command, with reference to FIG. 4A or 4B.

Hereinafter, a data read operation and a data write operation of a disk drive will be described.

In a data read operation of the disk drive, the pre-amplifier 410 amplifies an electrical signal sensed from the disk 12 by the head 16. The R/W channel 420 then amplifies a signal output from the pre-amplifier 410 by using an automatic gain control circuit (not shown) that automatically varies a gain according to an amplitude of the signal, converts the electrical signal into a digital signal, and then decodes the digital signal to detect data. For instance, an error correction process ma be performed on the detected data by the processor 430 using a Reed-Solomon code, which is an error correction code, and then the detected data can be converted into stream data so as to be transmitted to the host device via the host interface 480.

In a data write operation, the disk drive receives data from the host device via the host interface 480, and the processor 430 adds an error correction symbol using the Reed-Solomon code. The R/W channel 420 then encodes the data to be suitable for a write channel. Then, the data is written onto the disk 12 by the head 16 to which a write current amplified by the pre-amplifier 410 is applied.

Hereinafter, description will be given of an operation that the processor 430 executes the methods according to the flowcharts illustrated in FIGS. 15 to 19 and FIG. 31 using the program codes and information loaded to the RAM 470.

First of all, description will be given of a shingle-write scheme which is a newly proposed writing method to increase recording density in a disk drive as one of the storage device according to the present disclosure.

Figure 7:
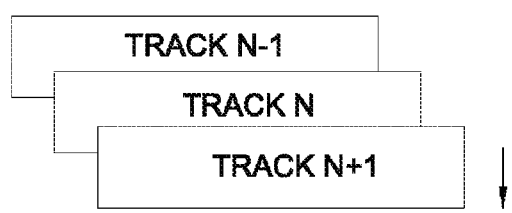
FIG. 7 is a schematic view illustrating a track shape in response to a flux generation in a shingle-write scheme in accordance with one exemplary embodiment.

The shingle-write is a scheme of executing a write operation in one direction since tracks of a disk are overlapped each other in the form of tiles. That is, as illustrated in FIG. 7, if it is assumed that writing is performed in an arrow-indicated direction in the shingle-write scheme, when writing is performed on N track adjacent to N−1 track, the N−1 track is partially overwritten. Also, when writing is performed on N+1 track adjacent to the N track, the N track is partially overwritten. This may result in enhancement of Track Per Inch (TPI) characteristic as a recording density in a radial direction of a storage medium.

Figure 8:
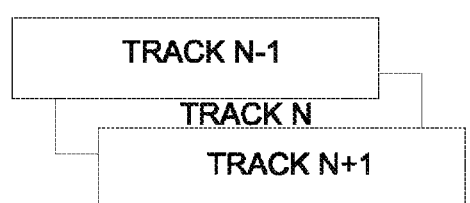
FIG. 8 is a schematic view illustrating a track shape in response to an adjacent track interference in a shingle-write scheme in accordance with one exemplary embodiment.

This shingle-write scheme always generates flux only in one direction. Therefore, a constraint that N−1 track cannot be written after the N track is written should be met. As illustrated in FIG. 8, after writing on the N track, if N−1 track is written in a reverse direction of the shingle-write being progressing, the N track is erased due to Adjacent Track Interference (ATI).

Therefore, to solve the problem, required is a technology of dynamically allocating a new disk address with respect to a Logical Block Address (LBA) provided by a host so as to always perform writing only in one of an inner circumferential direction or an outer circumferential direction of a disk.

The present disclosure proposes a method for utilizing an existing LBA as it is using a virtual address during conversion of the existing LBA into Cylinder Head Sector (CHS) as a physical address of a disk drive, and accessing a disk to satisfy a constraint that a shingle-write progresses only in one direction in the disk drive.

Figure 9:
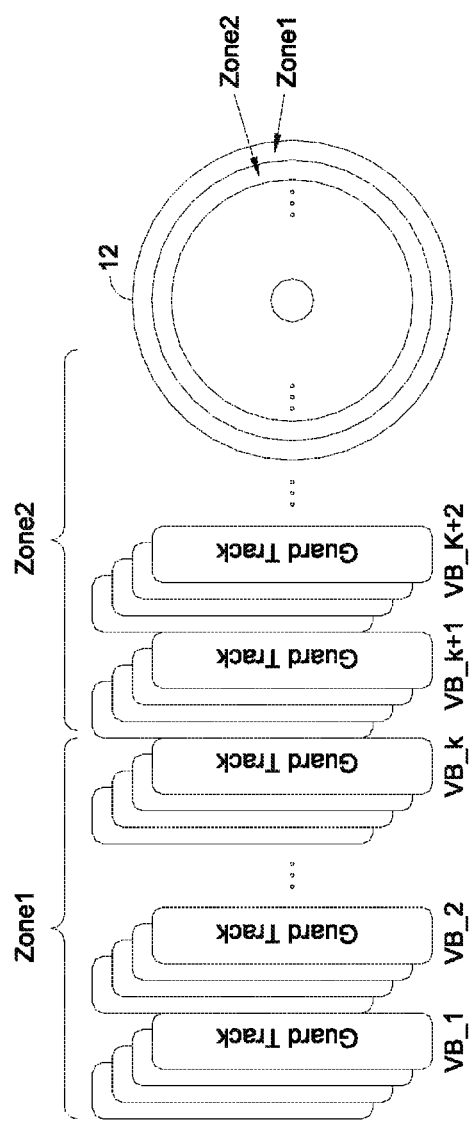
FIG. 9 is a schematic view illustrating a configuration of physical zones and virtual bands for a storage medium in accordance with one exemplary embodiment.

Hereinafter, a configuration of a zone and a virtual band for implementing an access method applied to the present disclosure will be described with reference to FIG. 9.

A storage area of the disk 12 may be divided into a plurality of physical zones. Each of the physical zones may have a differently set Tracks Per Inch (TPI) or Bits Per Inch (BPI) value as recording density. Each of the physical zones may include a plurality of virtual bands (VBs), and each virtual band may be defined as a set of M consecutive tracks, which are overwritten. A guard track may be present between the virtual bands to prevent overwriting therebetween. As illustrated in FIG. 9, a physical zone 1 may be allocated with K+1 virtual bands VB_0~VB_K. That is, this indicates that a physical storage space of a storage medium is divided into the virtual bands of a unit size. Tracks belonging to the virtual band may generate address mapping information such that data can be written sequentially in one of an inner circumferential direction or an outer circumferential direction of the disk.

Next, an allocation structure of a logical band and a virtual band per each zone will be described with reference to FIG. 10.

Figure 10:
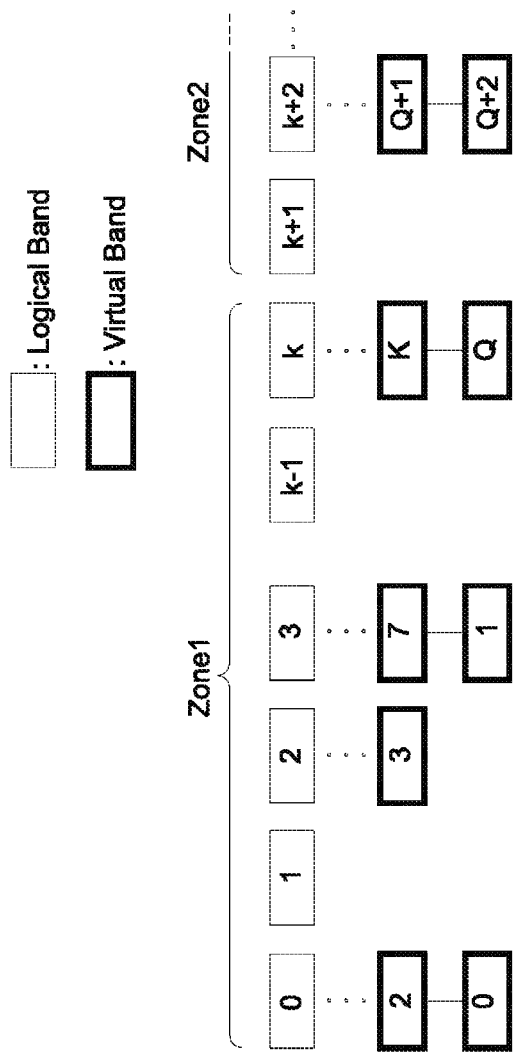
FIG. 10 is a schematic view illustrating a structure of virtual bends allocated to a logical band for each physical zone of a storage medium in accordance with one exemplary embodiment.

FIG. 10 is a schematic view illustrating an allocation structure of a Virtual Band (VB) with respect to a Logical Band (LB) for each physical zone of a storage medium in accordance with one exemplary embodiment.

As illustrated in FIG. 10, in order to actually execute a write operation on a physical zone of a storage medium, a virtual band is allocated to a logical band. A physical zone 1 of the storage medium may include K+1 logical bands. Here, the logical band is defined as a set of consecutive Logical Block Addresses (LBAs) of a first size unit. That is, the logical band indicates a set of consecutive writable LBAs.

For example, if it is assumed that the physical zone 1 includes 1000 LBAs in the range of 0 to 999, and a logical band belonging to the physical zone 1 is defined as a set of 100 LBAs, 10 logical bands may belong to the physical zone 1.

Here, the number (Q) of virtual bands may be set to be larger than the number (K) of logical bands (i.e., Q>K). Here, the virtual bands may be set by dividing the physical storage space of the storage medium by a second size unit. That is, when the storage medium is a disk, the virtual band, as illustrated in FIG. 9, can be defined at a set of M over-writable tracks.

Virtual bands without being allocated to the logical band, among the virtual bands, may be referred to reserved virtual bands. Expressing this differently, a storage area corresponding to virtual bands without being allocated to the logical band may be referred to as a reserved area. Reserved virtual band information may be stored in a free queue, which will be explained later with reference to FIG. 14.

Hereinafter, description will be given of an operation of accessing a storage medium using the allocation structure of the virtual band with respect to the logical band.

Figure 11:
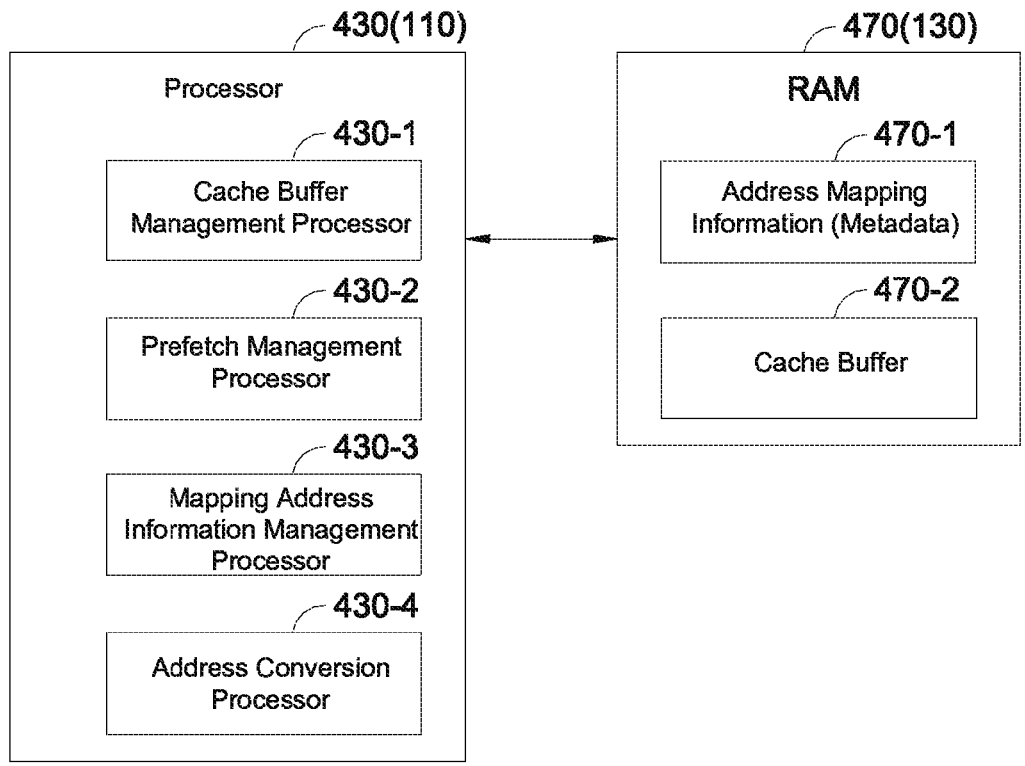
FIG. 11 is a detailed view illustrating a configuration of a processor and a RAM of a storage device in accordance with one exemplary embodiment.

FIG. 11 illustrates detailed structures of the processor 110 and the RAM 130 of the storage device illustrated in FIGS. 1A and 1B and the processor 430 and the RAM 470 of the disk drive illustrated in FIGS. 4A and 4B in accordance with the one exemplary embodiment of the present disclosure. For the sake of explanation, the structures illustrated in FIG. 11 will be described with reference to the disk drive of FIGS. 4A and 4B.

As illustrated in FIG. 11, the processor 430 may include a cache buffer management processor 430-1, a prefetch management processor 430-2, an address mapping information management processor 430-3, and an address conversion processor 430-4. The RAM 470 may store address mapping information 470-1, and data read from the disk 12 or data to be written in the disk 12 may be stored in an area of a cache buffer 470-2.

The address mapping information management processor 430-3 may execute a process of managing the address mapping information. In detail, when power is supplied to the disk drive, the address mapping information management processor 430-3 may load the address mapping information 470-1 from the disk 12 to the RAM 470. That is, the address mapping information management processor 430-3 may read the address mapping information 470-1 from the disk 12 to store in the RAM 470.

Here, the address mapping information 470-1 may include information for converting a logical block address into a physical address of the storage medium using a virtual address. As one example, the address mapping information may be mapping table information indicating an allocation relation between a logical band and a virtual band and an allocation relation between a logical block address and a virtual address in a virtual band allocated to the logical band. The address mapping information may be referred to as metadata. The address mapping information may include meta keys which indicate a mapping state of a physical address of the storage medium corresponding to the logical block address.

Hence, the address mapping information 470-1 may allow for searching a virtual address based on LBA. The virtual address may be defined based on the physical address of the storage medium. When the storage medium is a disk, the virtual address may be defined as a physical address of a sector. Also, the virtual address in the disk may be defined based on a Cylinder Head Sector (CHS). In addition, the virtual address in the disk may be defined based on a physical zone, a virtual band, a track and a sector. The address mapping information 470-1 may be generated such that data can be written sequentially in one of an inner or outer circumferential direction of the track of the disk included in the virtual band according to the shingle-write scheme.

The address mapping information 470-1 may include information indicating the allocation structure of the virtual bands with respect to the logical band and for each physical zone. That is, the address mapping information 470-1, as illustrated in FIG. 10, may include information indicating a mapping structure of the virtual bands allocated to the logical band for each physical zone.

Address mapping information, which indicates an allocated state of the virtual bands allocated to the logical band illustrated in FIG. 10, may be generated as illustrated in FIG. 20.

As illustrated in FIG. 20, the address mapping information may include items of a logical band number LB NO, a virtual band number VB NO, and a virtual address number LA VA which is last accessed on a virtual band.

Referring to FIG. 20, it can be noticed that virtual band numbers (VB NOs) 2 and 0 are allocated to a logical band number (LB NO) 0, the last accessed virtual address (LA VA) in the virtual band number 2 is 199, and the last accessed virtual address in the virtual band number 0 is 94.

One example shows that if each virtual band is divided into 200 sectors and virtual addresses for each virtual band are set in the range of 0 to 199, there is not a virtual address left to be newly allocated since the virtual addresses up to the last virtual address 199 have already been allocated to the virtual band number 2. In addition, when a write command for LBA belonging to the logical band number 0 is received, address mapping information may be updated so that the virtual address 95, which is obtained by adding 1 to the last accessed virtual address of the virtual band 0, can be mapped to LBA defined in the write command.

Figure 21:
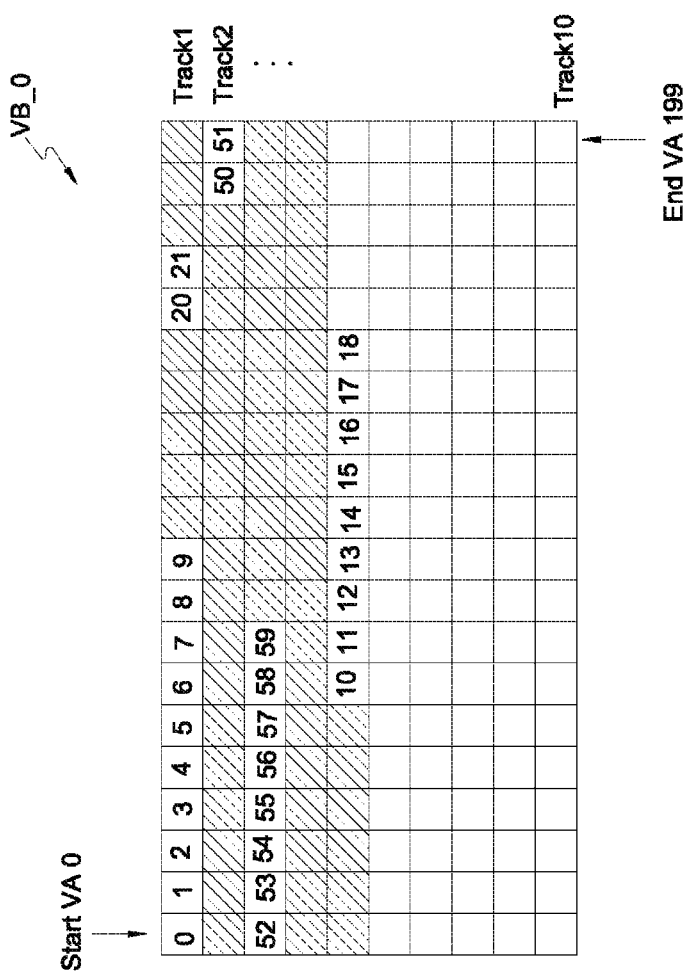
FIG. 21 is an overview illustrating of a mapping architecture of Virtual Addresses (VAs) with respect to LBAs on a virtual band number 0.

An example of mapping a virtual address (VA) to an LBA on a virtual band 0 (VB_0) allocated to the logical band 0 is illustrated in FIG. 21.

Referring to FIG. 21, the virtual band 0 (VB_0) includes virtual addresses from 0 to 199, and each virtual address is allocated in a sector unit. Hence, in FIG. 21, a unit virtual band includes 200 sectors. A horizontal line shows sectors included on one track. As illustrated in FIG. 21, one track includes 20 sectors. 20 sectors belonging to a track 1 are defined as virtual addresses (VAs) from 0 to 19. According to the same method, 20 sectors belonging to a track 10 are defined as VAs from 180 to 199.

Referring to FIG. 21, LBAs 0 to 9 are allocated to VAs 0 to 9, LBAs 20 and 21 are allocated to VAs 15 and 16, LBAs 50 to 59 are allocated to VAs 38 to 47, and LBAs 10 to 18 are allocated to VAs 86 to 94. VAs 10 to 14, 17 to 37 and 48 to 85 indicate invalid virtual addresses, and VAs 95 to 199 indicate valid virtual addresses without being allocated. The invalid virtual addresses indicate previous virtual addresses which corresponded to updated LBAs.

Figure 22A:
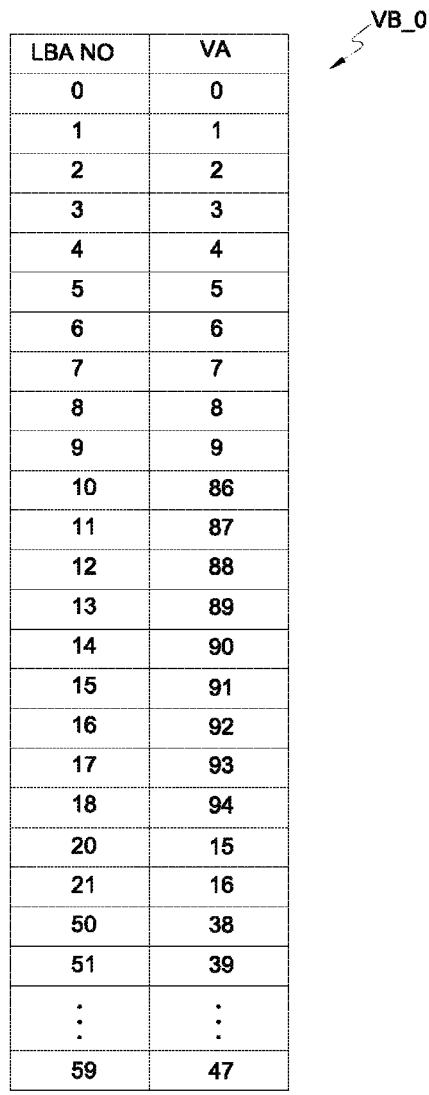
FIG. 22A illustrates one example of address mapping information related to the virtual band number 0 illustrated in FIG. 21.

As one example, the address mapping information for the virtual band 0 (VB_0) illustrated in FIG. 21 may be generated as illustrated in FIG. 22A.

FIG. 22A is a mapping table simply illustrating a mapping relation between VAs and corresponding individual LBAs allocated to VB_0. The mapping table with the structure illustrated in FIG. 22A may have a disadvantage in view of a large quantity of data due to simply arranging the VAs corresponding to the respective LBAs.

To overcome such disadvantage, a method for generating address mapping information by setting LBAs and VAs which are sequentially increasing with each other into one group may be proposed.

That is, in the newly proposed address mapping information, a group in which the LBAs and VAs are sequentially increasing is represented by a start LBA, a start VA and the number of sequentially increasing sectors (SIZE).

Referring to FIG. 21, LBAs 0 to 9 are sequentially increasing in VAs 0 to 9, LBAs 20 to 21 are sequentially increasing in VAs 15 to 16, LBAs 50 to 59 are sequentially increasing in VAs 38 to 47, and LBAs 10 to 18 are sequentially increasing in VAs 86 to 94.

Figure 22B:
FIG. 22B illustrates another example of address mapping information related to the virtual band number 0 illustrated in FIG. 21.

Mapping information related to the four groups in which the LBAs and VAs are sequentially increasing together, as aforementioned, may be represented in a table as illustrated in FIG. 22B.

Since the start LBA is 0, the start VA is 0 and the number of sequentially increasing sectors is 10 with respect to the group in which the LBAs 0 to 9 are sequentially increasing in the VAs 0 to 9, (LBA, SIZE, VA) may be represented by (0, 10, 0). In the present disclosure, the mapping information represented by (LBA, SIZE, VA) constructing the address mapping information may be referred to a meta key.

Similarly, since the start LBA is 20, the start VA is 15, and the number of sequentially increasing sectors is 2 with respect to the group in which the LBAs 20 to 21 are sequentially increasing in the VAs 15 to 16, a meta key (LBA, SIZE, VA) may be represented by (20, 2, 15). In addition, for the group in which the LBAs 50 to 59 are sequentially increasing in the VA 38 to 47, a meta key (LBA, SIZE, VA) may be represented by (50, 10, 38), and for the group in which the LBAs 10 to 18 are sequentially increasing in the VAs 86 to 94, a meta key (LBA, SIZE, VA) may be represented by (10, 9, 86). Consequently, for an area where the logical block addresses and the corresponding virtual addresses are sequentially increasing together, mapping information can be generated by one meta key.

Accordingly, address mapping information may be generated as illustrated in FIG. 22B. Referring to FIG. 22B, mapping information of VA with respect to LBA on VB_0 as the virtual band number 0 is generated by four meta keys. It can be noticed that the address mapping information illustrated in FIG. 22B is simplified more than the address mapping information illustrated in FIG. 22A, and the quantity of data is reduced. Consequently, the address mapping information for each virtual band allocated to the logical band may be generated according to the method illustrated in FIG. 22B.

Referring back to FIG. 11, the RAM 470 may store the address mapping information 470-1 including meta keys, which correspond to mapping information indicating the allocation relation between the logical band and the virtual bands and the last accessed virtual address on the virtual band as illustrated in FIG. 20, and mapping information indicating VA corresponding to LBA on a virtual band allocated to the logical band as illustrated in FIG. 22B.

The address mapping information management processor 430-3 may change the address mapping information 470-1 stored in the RAM 470 based on a write command. That is, the address mapping information management processor 430-3 may add virtual band information newly allocated to a logical band and virtual address information added in correspondence with the LBA on the allocated virtual band to the address mapping information 470-1 stored in the RAM 470 according to the write command. Consequently, the address mapping information 470-1 stored in the RAM 470 may be updated every time of executing the write command.

The address mapping information management processor 430-3 may read the address mapping information 470-1 stored in the RAM 470 to write on the disk 12 when a system end (finish) command is received. Accordingly, the updated address mapping information 470-1 may be stored in the disk 12.

The cache buffer management processor 430-1 may store data read from the disk 12 in the area of the cache buffer 470-2, and generate information related to LBA for the data stored in the cache buffer 470-2 and a storage position of the data to store in the RAM 470.

When a read command is received, the cache buffer management processor 430-1 may check whether or not data to be read by the read command is present in the area of the cache buffer 470-2. That is, the cache buffer management processor 430-1 may check whether or not data corresponding to an LBA designated by the read command has been stored in the area of the cache buffer 470-2.

If the data to be read by the read command has been stored in the area of the cache buffer 470-2, the cache buffer management processor 430-1 may read the data corresponding to the LBA designated by the read command from the area of the cache buffer 470-2 and transmit the data to the host device via the host interface 480.

When the remaining size of the area of the cache buffer 470-2 is less than a threshold value, the cache buffer management processor 430-1, for example, may perform data replacement in the area of the cache buffer 470-2 based on the order of lower cache hit ratio. That is, when the remaining size of the area of the cache buffer 470-2 is less than the threshold value, data with the lowest cache hit ratio is first deleted, and the data read out of the disk 12 is stored in the deleted position.

When the data to be read by the read command is not stored in the area of the cache buffer 470-2, the processor 430 may control the disk drive to perform a process of accessing the physical address of the disk 12 corresponding to the LBA designated by the read command so as to read data.

While reading data from the disk 12, it is necessary to spend a seek time for which the head 16 is moved up to a track of the disk 12, on which the desired data is stored, and a disk rotation time, which is required until the head 16 reaches a sector position where the data is stored after the track seek. To minimize such time required for reading data from the disk 12, the disk drive may perform a cache management for temporarily storing data read from the disk 12 or data to be written to the disk 12 in a memory device such as the RAM 470.

It may be likely to read again later an area adjacent to an LBA area which has been once read. Therefore, LBA areas before and after an LBA area, which is designated by the read command, are read beforehand when reading the LBA area designated by the read command, and the read data is stored in the area of the cache buffer 470-2. Afterwards, when data corresponding to an LBA designated by a succeedingly received read command is stored in the area of the cache buffer 470-2, the data corresponding to the LBA designated by the read command can be read from the area of the cache buffer 470-2 without accessing the disk 12.

As such, the reading in advance of the data stored in a forward portion of the LBA area designated by the read command is referred to as a backward prefetch, and the reading in advance of the data stored in a backward portion of the LBA area designated by the read command is referred to as a forward prefetch.

Hereinafter, description will be given of a method for performing a prefetch operation in a storage device adapting a dynamic address conversion scheme proposed in the present disclosure.

A dynamic address conversion indicates a scheme for dynamically allocating a disk address for an LBA received from a host device. As one example, the dynamic address conversion scheme may be applied to the shingle-write. This has already been described in FIGS. 9 and 10 and FIGS. 20 to 22B, so duplicate description will be omitted. Referring to FIG. 21, since LBAs are not fixedly mapped in the dynamic address conversion, non-consecutive (discontinuous) LBA areas on a track of a disk may exist.

As such, since LBAs may be physically discontinuous on a track in a storage device to which the dynamic address conversion is applied, a new prefetch method appropriate therefor is proposed in the present disclosure.

As described in FIG. 22B, the meta key generated by the dynamic address conversion scheme may represent the physical address of a disk corresponding to LBA by (LBA, SIZE, VA). Here, it may be said that the physical address is continuous by SIZE based on LBA.

The present disclosure proposes a method for performing a prefetch operation within a range allowed by a meta key in a storage device adapting the dynamic address conversion scheme, using the characteristic of the dynamic address conversion scheme and the characteristic of the meta key.

Still referring to FIG. 11, the prefetch management processor 430-2 may control the disk drive to perform a prefetch operation within a range allowed by a meta key. In detail, the prefetch management processor 430-2 may search for a meta key corresponding to an address included in a first area designated by a read command from the address mapping information 470-1 stored in the RAM 470, and control the disk drive to perform a prefetch operation according to the read command within a range of a second area designated by the searched meta key.

When a second start LBA designated by a meta key, corresponding to a first start LBA designated by a read command, is included within a track of a disk corresponding to the first start LBA, the prefetch management processor 430-2 may decide a prefetch area to perform a backward prefetch operation from the second start LBA. However, when the second start LBA designated by the meta key, corresponding to the first start LBA designated by the read command, is not included within the track of the disk corresponding to the first start LBA, the prefetch management processor 430-2 may decide a prefetch area to perform a backward prefetch operation, starting from a third start LBA, which is accessible by the meta key corresponding to the first start LBA within the track of the disk corresponding to the first start LBA.

The prefetch management processor 430-2 may decide a prefetch area to perform a forward prefetch operation up to LBA having the greatest value, which is accessible in a track of a disk corresponding to the last LBA of a first area designated by a read command, among LBAs accessible by a meta key, corresponding to the last LBA of the first area designated by the read command.

Figure 12:
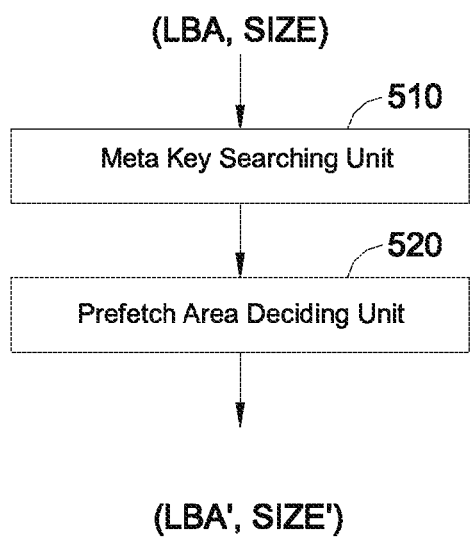
FIG. 12 is a detailed view illustrating a configuration of a prefetch management processor illustrated in FIG. 11.

The details of the prefetch management processor 430-2 is illustrated in FIG. 12. Hereinafter, a prefetch operation will be described in detail with reference to FIG. 12.

As illustrated in FIG. 12, the prefetch management processor 430-2 may include a meta key searching unit 510, and a prefetch area deciding unit 520.

First, 'LBA' of (LBA, SIZE) designated by a read command is referred to as LBA_COMMAND, and 'SIZE' thereof is referred to as SIZE_COMMAND. Also, 'LBA' of (LBA, SIZE, VA) designated by a meta key is referred to as LBA_META KEY, and 'SIZE' thereof is referred to as SIZE_META KEY. Accordingly, the LBA_COMMAND is a start LBA designated by the read command, and the LBA-META KEY is a start LBA designated by the meta key. 'SIZE' designated by each of the command and the meta key indicates the number of LBAs. LAST LBA_META KEY indicates the last LBA designated by the corresponding meta key.

When receiving a read command, the meta key searching unit 510 may search for a meta key, which corresponds to LBAs included in a first area designated by (LBA, SIZE) included in the read command, from the address mapping information 470-1 stored in the RAM 470. Here, the LBAs included in the first area may be from LBA_COMMAND to (LBA+SIZE−1)_COMMAND.

The meta key searching unit 510 may search for a meta key, which corresponds to addresses from a start position address to an end position address of the first area designated by (LBA, SIZE) included in the read command, from the address mapping information 470-1. Here, the start position address of the first area may be LBA_COMMAND, and the end position address of the first area may be (LBA+SIZE−1)_COMMAND. Also, if it is assumed that a meta key corresponding to the LBA_COMMAND is 'META KEY 1', and a meta key corresponding to (LBA+SIZE−1)_COMMAND is 'META KEY 2', it can be noticed that the LBA_COMMAND is included in an LBA area designated by META KEY 1, and the (LBA+SIZE−1)_COMMAND is included in an LBA area designated by META KEY 2.

The prefetch area deciding unit 520 may decide a backward prefetch area and a forward prefetch area based on the searched META KEY 1 and META KEY 2.

First, description will be given of an operation of deciding a backward prefetch area by the prefetch area deciding unit 520.

The prefetch area deciding unit 520 may decide, as NEW LBA, an LBA having a greater value, of LBA_META KEY as a start LBA designated by META KEY 1 and START LBA_META KEY_TARGET1 TRACK as a start LBA accessible by META KEY 1 within a track to which VA corresponding to LBA_COMMAND is allocated.

After comparing (LBA+SIZE)_META KEY value with (LBA+SIZE)_COMMAND value, if (LBA+SIZE)_META KEY value is smaller than or equal to (LBA+SIZE)_COMMAND value, LBA' which is a start LBA value whose data is desired to be read from the disk 12 and SIZE' as a size of an area to be read will be calculated by Equation 1.

$$SIZE' = SIZE\_META\ KEY - (NEW\ LBA - LBA\_META\ KEY)$$

$$LBA' = NEW\ LBA \qquad \text{[Equation 1]}$$

If (LBA+SIZE)_META KEY value is greater than (LBA+SIZE)_COMMAND value, a smaller value of LAST LBA_META KEY value and LAST LBA_META KEY_TARGET2 TRACK value may be decided as NEW LAST LBA. Here, LAST LBA_META KEY indicates the last LBA value of an LBA area designated by the searched META KEY1, and LAST LBA_META KEY_TARGET2 TRACK indicates the last LBA value accessible by META KEY1 searched within a track, to which VA corresponding to (LBA+SIZE−1)_COMMAND is allocated.

In addition, LBA' as a start LBA value whose data is desired to be read from the disk 12 and SIZE' as a size of an area to be read will be calculated by Equation 2.

$$SIZE' = SIZE\_META\ KEY - (NEW\ LBA - LBA\_META\ KEY) - (LAST\ LBA\_META\ KEY - NEW\ LAST\ LBA)$$

$$LBA' = NEW\ LBA \qquad \text{[Equation 2]}$$

Thus, when (LBA', SIZE') decided by the prefetch area deciding unit 520 is output by the address conversion processor 430-4, a backward prefetch operation may be performed based on (LBA', SIZE').

That is, LBA_META KEY of META KEY 1 is changed to NEW LBA, and SIZE_META KEY is decided as the SIZE' value calculated by Equation 1 or Equation 2 based on the comparison result between (LBA+SIZE)_META KEY value and (LBA+SIZE)_COMMAND value, thereby performing the backward prefetch operation.

Hereinafter, description will be given of an operation of deciding a forward prefetch area by the prefetch area deciding unit 520.

The prefetch area deciding unit 520 may decide, as NEW LAST LBA, LBA having a smaller value, of LAST LBA_META KEY which is the last LBA designated by META KEY 2 and LAST LBA_META KEY_TARGET2 TRACK as the last LBA accessible by META KEY 2 within a track to which VA corresponding to (LBA+SIZE−1)_COMMAND is allocated.

Next, LBA' as a start LBA value whose data is desired to be read from the disk 12 and SIZE' as a size of an area to be read will be calculated by Equation 3.

$$SIZE' = SIZE\_META\ KEY - (LAST\ LBA\_META\ KEY - NEW\ LAST\ LBA)$$

$$LBA' = LBA\_META\ KEY \qquad \text{[Equation 3]}$$

Thus, when (LBA', SIZE') decided by the prefetch area deciding unit 520 is output by the address conversion processor 430-4, a forward prefetch operation may be performed based on (LBA', SIZE').

That is, LBA_META KEY of META KEY 2 is decided as a start LBA and SIZE_META KEY is decided as SIZE' value calculated by Equation 3, thereby performing the forward prefetch operation.

FIGS. 23 to 28 illustrate a relationship between a meta key and a command in a track according to various examples for describing an operation of deciding a prefetch area in a data reading method in accordance with one exemplary embodiment.

Figure 23:
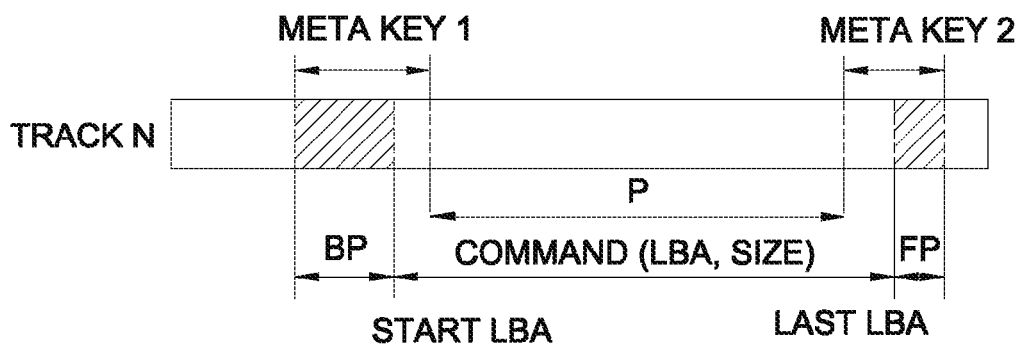
FIGS. 23 to 28 illustrate a relationship between a meta key and a command on a track according to various examples for explaining an operation of deciding a prefetch area in a data reading method in accordance with one exemplary embodiment.

FIG. 23 illustrates an example that an area designated by a read command is included in a single track N, an area designated by META KEY 1 corresponding to LBA_COMMAND is included in one track, and an area designated by META KEY 2 corresponding to (LBA+SIZE−1)_COMMAND is included in one track.

In this case, an LBA area from a start LBA designated by META KEY 1 to LBA right before START LBA of the read command is decided as a backward prefetch area (i.e., BP). That is, an area from LBA_META KEY to (LBA−1)_COMMAND is decided as the backward prefetch area BP. An LBA area from LBA right after LAST LBA of the read command to the last LBA designated by META KEY 2 is decided as a forward prefetch area (i.e., FP). That is, an area from (LBA+SIZE)_COMMAND to (LBA+SIZE−1)_META KEY is decided as a forward prefetch area FP.

In addition, a data read operation may be performed according to a meta key corresponding to LBA included in P area which is LBA area between META KEY 1 and META KEY 2.

Figure 24:
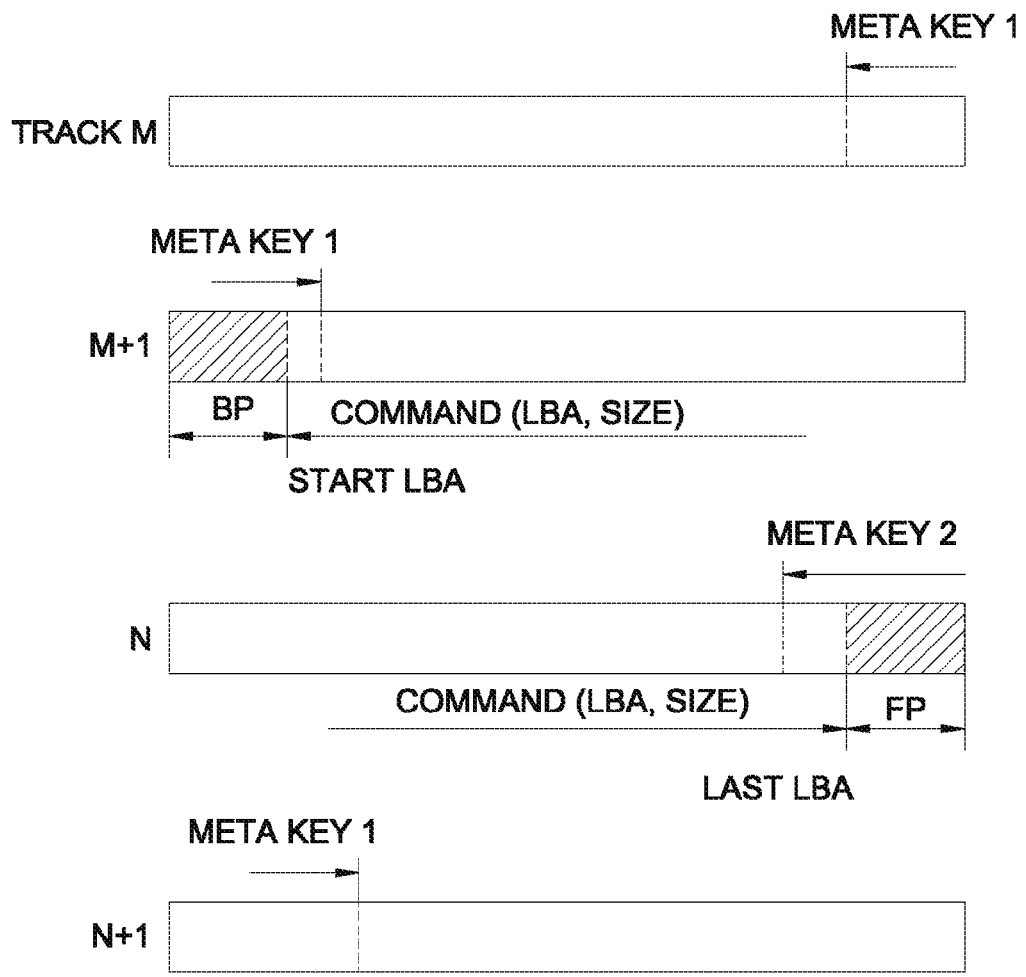

FIG. 24 illustrates an example that an area designated by a read command is included in a plurality of tracks, an area designated by META KEY 1 corresponding to LBA_COMMAND is included in a plurality of tracks, and an area designated by META KEY 2 corresponding to (LBA+SIZE−1)_COMMAND is also included in a plurality of tracks.

In this case, LBA area from LBA having a greater value, of LBA_META KEY as a start LBA designated by META KEY 1 and START LBA_META KEY_TARGET1 TRACK as a start LBA accessible by META KEY 1 in a track to which VA corresponding to LBA_COMMAND is allocated, to LBA right before START LBA of the read command is decided as a backward prefetch area BP. That is, an area from START LBA_META KEY_TARGET1 TRACK to (LBA−1)_COMMAND is decided as the backward prefetch area BP.

An area from LBA right after LAST LBA designated by the read command to the last LBA accessible by META KEY 2 within a track, to which VA corresponding to (LBA+SIZE−1)_COMMAND is allocated, is decided as a forward prefetch area FP. That is, an area from (LBA+SIZE)_COMMAND to LAST LBA_META KEY_TARGET2 TRACK is decided as the forward prefetch area FP.

Figure 25:
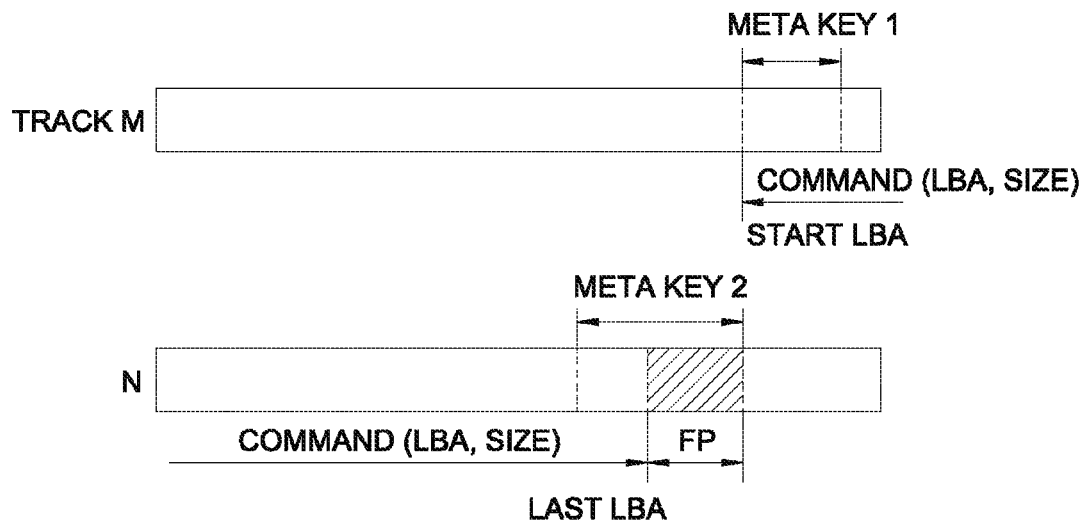

FIG. 25 illustrates an example that an area designated by a read command is included in a plurality of tracks, and a start LBA of the read command is equal to a corresponding start LBA of META KEY 1, namely, LBA_COMMAND and LBA_META KEY are equal to each other.

Here, a backward prefetch may not be performed, and a forward prefetch area FP may be decided as an area from (LBA+SIZE)_COMMAND to (LBA+SIZE−1)_META KEY.

Figure 26:
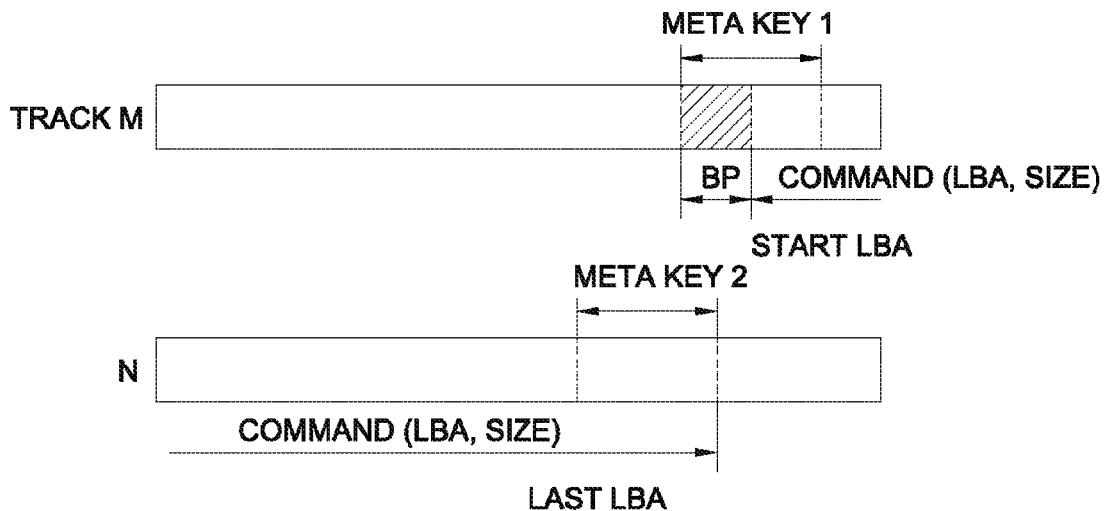

FIG. 26 illustrates an example that an area designated by a read command is included in a plurality of tracks, and LAST LBA of the read command and a corresponding LAST LBA of META KEY 2 are equal to each other, namely, (LBA+SIZE−1)_COMMAND and (LBA+SIZE−1)_META KEY are equal to each other.

Here, a backward prefetch area BP may be decided as an area from LBA_META KEY to (LBA−1)_COMMAND, and a forward prefetch may not be performed.

Figure 27:
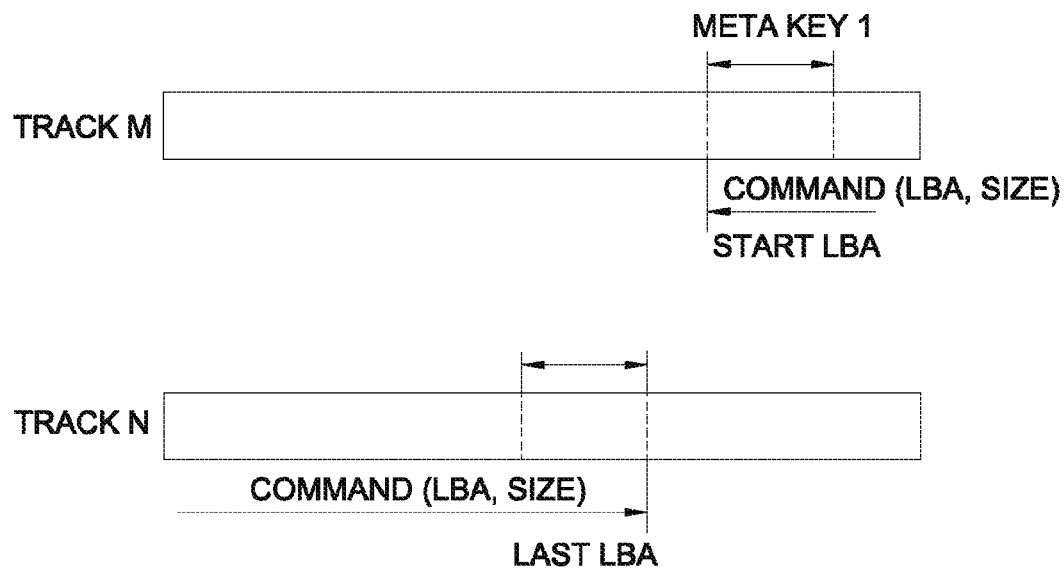

FIG. 27 illustrates an example that an area designated by a read command is included in a plurality of tracks, a start LBA of the read command and a corresponding start LBA of META KEY 1 are equal to each other, and a last LBA of the read command and a corresponding last LBA of META KEY 2 are equal to each other.

Here, since LBA_COMMAND and LBA_META KEY 1 are equal to each other and (LBA+SIZE−1)_COMMAND and (LBA+SIZE−1)_META KEY are equal to each other, the backward prefetch and the forward prefetch may not be performed.

Figure 28:
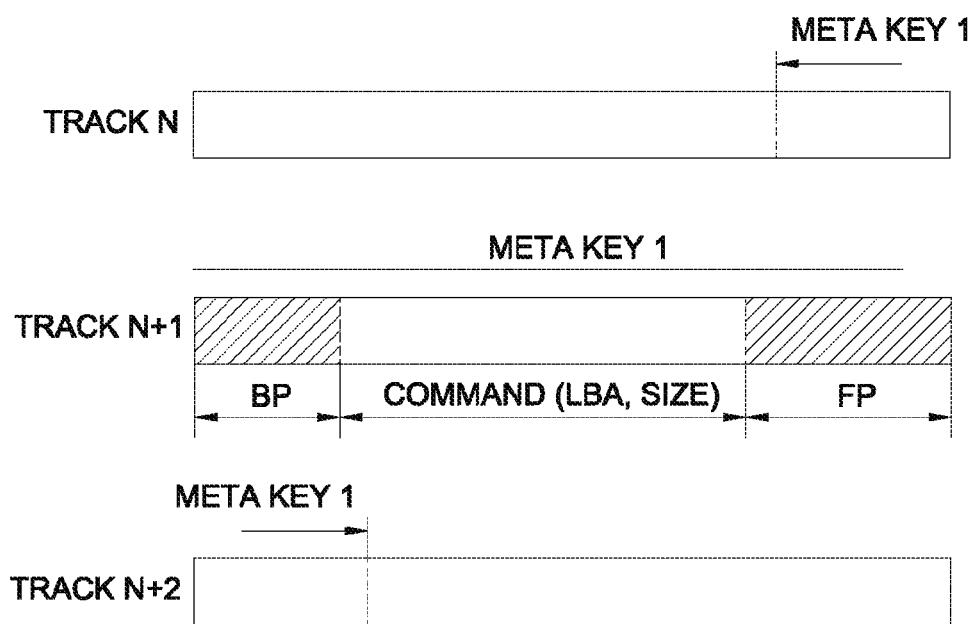
Figure 29:
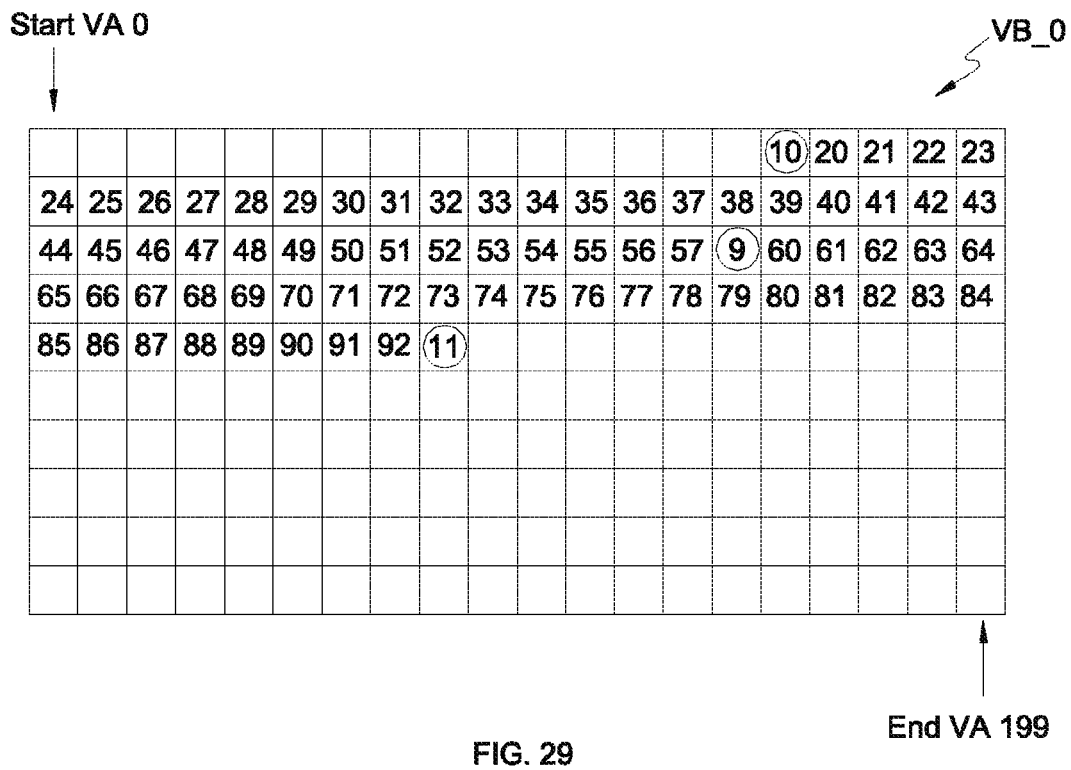
FIG. 29 is a view illustrating one example of a mapping state between LBA and VA on a virtual band number 0 to which data is written, for explaining a prefetch operation in a data reading method in accordance with one exemplary embodiment.

FIG. 28 illustrates an example that an area designated by a read command is included in one track, and an area designated by META KEY 1 includes the area designated by the read command and is present over a plurality of tracks.

Here, LBA area from LBA having a greater value, of LBA_META KEY as a start LBA designated by META KEY 1 and START LBA_META KEY_TARGET1 TRACK as a start LBA accessible by META KEY 1 within a track, to which VA corresponding to LBA_COMMAND is allocated, to LBA right before START LBA of the read command is decided as a backward prefetch area BP. That is, an area from START LBA_META KEY_TARGET1 TRACK to (LBA−1)_COMMAND is decided as the backward prefetch area BP. In addition, an area from LBA right after LAST LBA designated by the read command to the last LBA accessible by META KEY 2 within a track, to which VA corresponding to (LBA+SIZE−1)_COMMAND is allocated, is decided as a forward prefetch area (FP). That is, an area from (LBA+SIZE)_COMMAND to LAST LBA_META KEY_TARGET2 TRACK is decided as the forward prefetch area FP.

Referring back to FIG. 11, the address conversion processor 430-4 may perform a conversion into physical position information of a storage medium based on (LBA', SIZE') output by the prefetch management processor 430-2. The address conversion processor 430-4 may perform a process of converting LBA for an area to be written based on (LBA', SIZE'), which is information related to a position to be written and included in a write command, into physical position information of the storage medium using virtual bands and virtual addresses.

Figure 13:
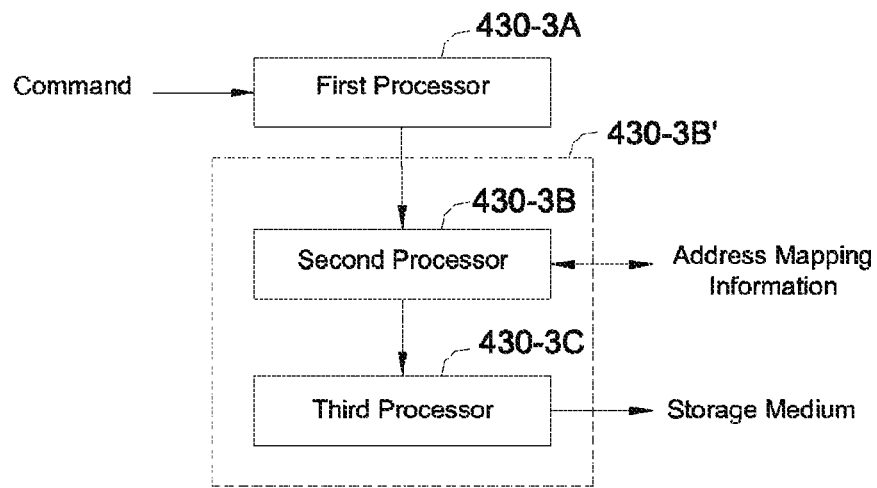
FIG. 13 an address conversion processor illustrated in FIG. 11.

Details of the address conversion processor 430-4 are illustrated in FIG. 13.

As illustrated in FIG. 13, the address conversion processor 430-4 may include a first processor 430-3A, a second processor 430-3B and a third processor 430-3C.

The first processor 430-3A may perform an operation of extracting LBA to be written or read from (LBA, SIZE) included in a read command received or (LBA', SIZE') output from the prefetch management processor 430-2.

The second processor 430-3B may perform an operation of converting the LBA extracted by the first processor 430-3A into a virtual address when a write command is received. That is, the second processor 430-3B performs an operation of searching for the address mapping information 470-1 to convert the LBA into a virtual address.

The second processor 430-3B may allocate a virtual band and a virtual address corresponding to LBA designated by a write command, as follows.

Figure 14:
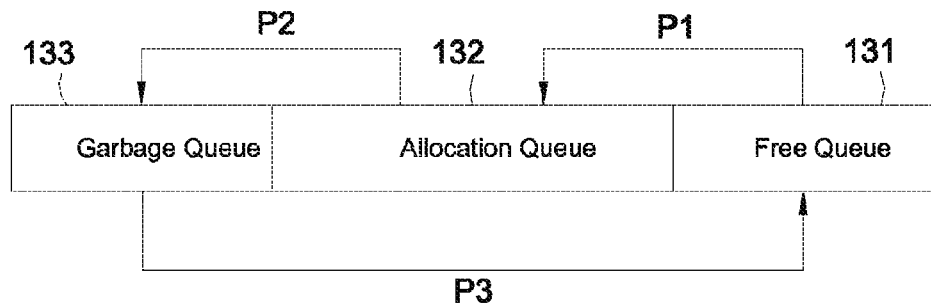
FIG. 14 is a detailed view illustrating a configuration of a second processor illustrated in FIG. 13.

Referring to FIG. 14, the second processor 430-3B may include a free queue 131, an allocation queue 132, and a garbage queue 133. The second processor 430-3B may convert LBA for a position to be written into a virtual address using the free queue 131, the allocation queue 132 and the garbage queue 133.

The second processor 430-3B may store information related to virtual bands, which have not been allocated to a logical band, in the free queue 131 in a preset order. The free queue 131 is an element in which information related to virtual bands to be allocatable to a logical band according to a command are stored and waited for selection. The free queue 131 may store those information related to virtual bands to be allocatable to a logical band for each physical zone in a sorting manner.

The second processor 430-3B may store information related to virtual bands allocated to the logical band in the allocation queue 132. In detail, when a virtual band allocated to a logical band including LBA for a position to be written is not present in the address mapping information 470-1 or every virtual address has completely been allocated in virtual bands allocated to the logical band including the LBA for the position to be written, the second processor 430-3B may select one virtual band waited in the free queue 131 and allocate the one virtual band to the logical band including the LBA for the position to be written so as to move to the allocation queue 132 (P1).

Next, the second processor 430-3B may allocate a virtual address corresponding to the LBA for the position to be written based on the virtual band allocated to the logical band stored in the allocation queue 132. In detail, when a new virtual address is allocated to the logical band including the LBA for the position to be written and stored in the allocation queue 132, the second processor 430-3B may allocate the newly allocated virtual address corresponding to a first sector of the logical band to the LBA designated by a command.

When a virtual band which has already been allocated to the logical band including the LBA for the position to be written is present in the allocation queue 132, the second processor 430-3B may allocate a virtual address which is left without being allocated in the corresponding virtual band to the LBA for the position to be written. As one example, the second processor 430-3B may allocate a virtual address for a sector right after a sector, which is last accessed in the virtual band, to the LBA for the position to be written.

The second processor 430-3B may select a virtual band, in which the number of virtual addresses invalidated due to data update exceeds a threshold value, from the virtual bands allocated to the logical band, and move the selected virtual band to the garbage queue 133 (P2).

For example, when the number of virtual bands stored in the free queue 131 is less than an initially set minimum value, the second processor 430-3B performs a garbage collection process. That is, the second processor 430-3B reads data stored in a sector of valid virtual addresses in the virtual band stored in the garbage queue 133, and rewrites the data to a virtual address defined in a newly allocated virtual band from the free queue 131.

The second processor 430-3B may move information related to the virtual band, in which the rewriting has been performed, of the virtual bands stored in the garbage queue 133, to the free queue 131 (P3).

Upon reception of a read command, the second processor 430-3B may convert LBA included in (LBA', SIZE') output by the prefetch management processor 430-2 into a virtual address with reference to address mapping information.

The third processor 430-3C may convert the virtual address converted by the second processor 430-3B into a physical address of the disk, and control the storage device to access the storage medium according to the converted physical address. That is, the third processor 430-3C may convert the virtual address into Cylinder Head Sector (CHS) information indicating the physical position of the disk, and generate a VCM driving control signal for accessing the disk based on the converted CHS information.

Referring to FIGS. 4A and 4B, when the VCM driving control signal generated by the third processor 430-3C is applied to the VCM driving unit 440, the VCM driving unit 440 generates a VCM driving current corresponding to the VCM driving control signal and supplies the current to a VCM 30. In turn, the magnetic head 16 is moved to a track position of a disk desired to access, and performs a data write or read operation corresponding to a command.

Through such processes, data read out of the disk 12 can be stored in the area of the cache buffer 470-2 by the cache buffer management processor 430-1.

Figure 15:
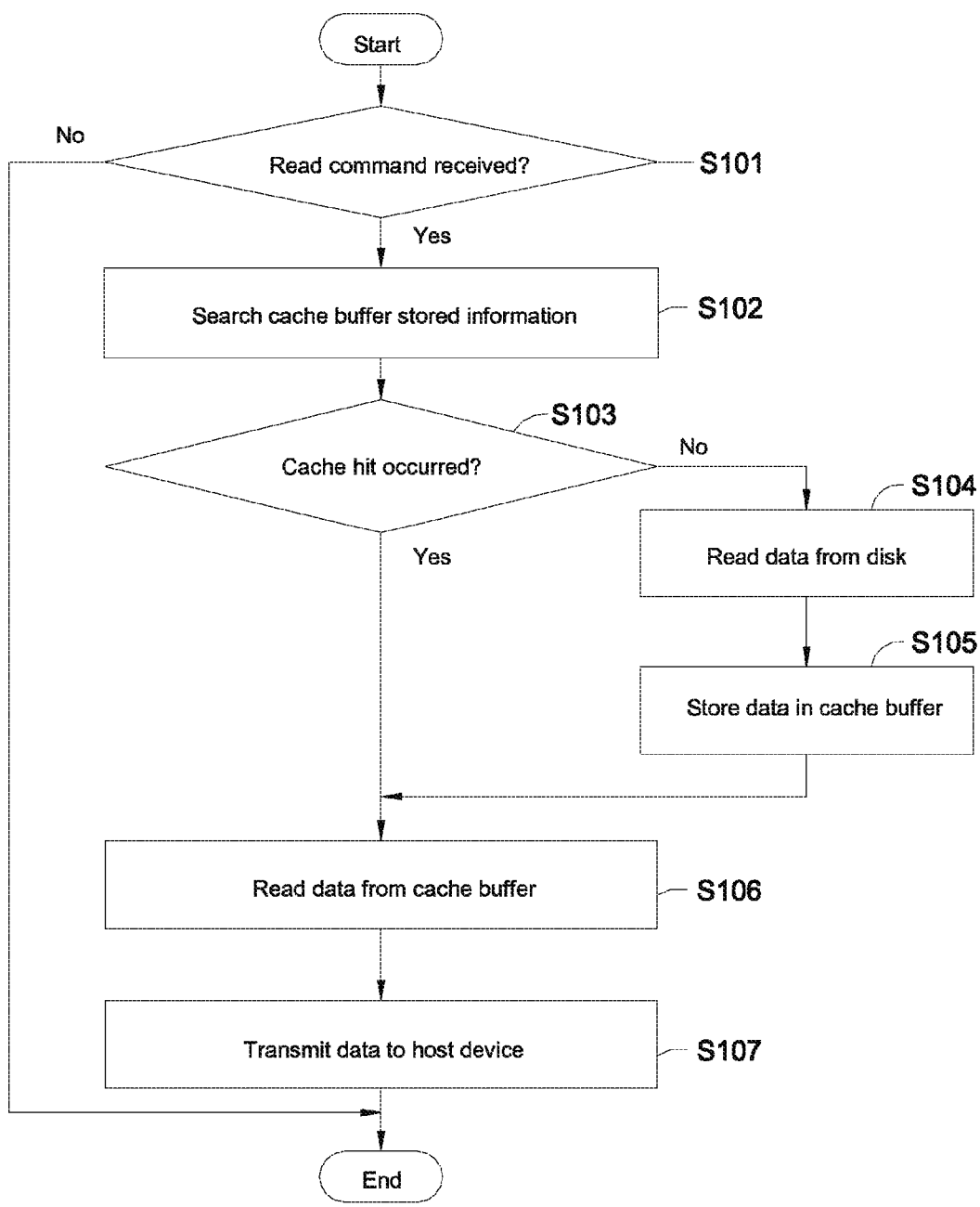
FIG. 15 is a flowchart illustrating a data reading method in accordance with one exemplary embodiment.

Hereinafter, description will be given of a data reading method in accordance with one exemplary embodiment, which is executed by the control of the processor 110 illustrated in FIGS. 1A and 1B or the processor 430 illustrated in FIGS. 4A and 4B, with reference to FIG. 15. For the sake of explanation, FIG. 15 will be described with reference to the disk drive of FIGS. 4A and 4B.

The processor 430 determines whether or not a read command has been received from the host device 2000 (S101).

When it is determined at the step S101 that the read command has been received from the host device 2000, the processor 430 searches whether or not data for LBA area designated by the read command is present in the area of the cache buffer 470-2 (S102).

The processor 430 then determines whether a cache hit has been generated based on the search result of the step S102 (S103). When the data for the LBA area designated by the read command is stored in the area of the cache buffer 470-2, it is determined as the cache hit having generated, and if not, it is determined as the cache hit having not generated.

When the cache hit has been generated according to the determination result of the step S103, the processor 430 reads data for the LBA area designated by the read command from the area of the cache buffer 470-2 (S106). Hence, when the cache hit has been generated, the data requested by the read command can be read without accessing the disk 12.

When the cache hit has not been generated according to the determination result of the step S103, a data read operation from the disk 12 is performed based on (LBA, SIZE) included in the read command (S104). The data read operation will be described with reference to the flowchart illustrated in FIG. 16.

Figure 16:
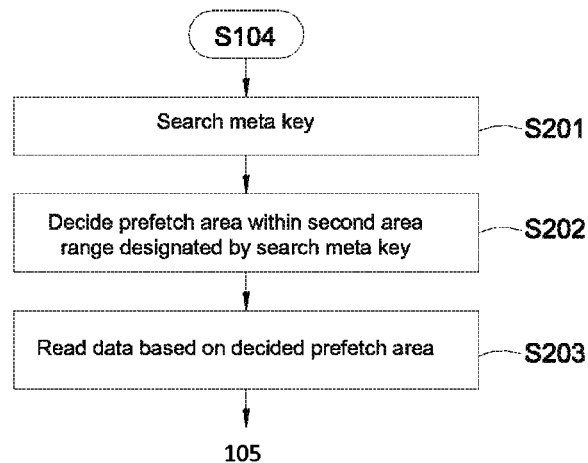
FIG. 16 is a detailed flowchart according to one exemplary embodiment of performing a process of a step S104 illustrated in FIG. 15.

Referring to FIG. 16, when the cache hit has not been generated, the processor 430 searches for a meta key, which corresponds to addresses from a start position address to an end position address of a first area designated by (LBA, SIZE) included in the read command, from the address mapping information 470-1 (S201).

The processor 430 decides a prefetch area within a range of a second area designated by the searched meta key. The processor 430 may decide a backward prefetch area and a forward prefetch area within the range of the second area designated by the searched meta key, which will be described in detail with reference to FIG. 17.

Figure 17:
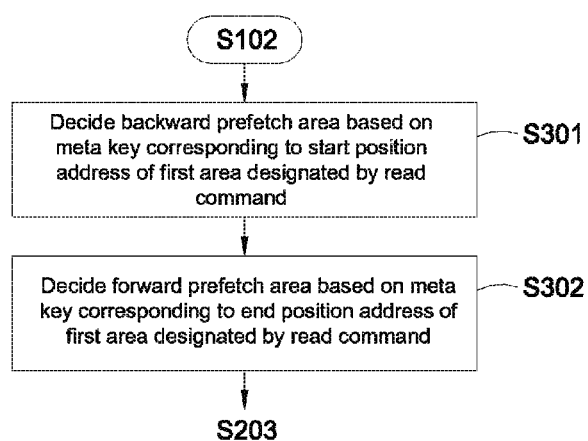
FIG. 17 is a detailed flowchart according to another exemplary embodiment of performing a process of a step S202 illustrated in FIG. 16.

Referring to FIG. 17, the processor 430 decides a backward prefetch area based on the meta key corresponding to the start position address of the first area designated by the read command (S301).

In detail, the processor decides the backward prefetch area so that a backward prefetch operation is executed within a range of a third area designated by the meta key corresponding to the start position address of the first area. More concretely, the processor 430 may decide an area, which is not included in the first area, of the third area included within a track of a disk corresponding to the start position address of the first area, as a backward prefetch area.

The processor 430 then decides a forward prefetch area based on the meta key corresponding to the end position address of the first area designated by the read command (S302).

In detail, the processor 430 decides a forward prefetch area so that a forward prefetch operation can be executed within a range of a fourth area designated by the meta key corresponding to the end position address of the first area. More concretely, the processor 430 may decide a portion, which is not included in a first area, of the fourth area included in a track of the disk corresponding to the end position address of the first area, as a forward prefetch area.

Referring back to FIG. 16, the processor 430 performs a data read operation based on the backward prefetch area and the forward prefetch area decided according to the flowchart illustrated in FIG. 17 (S203). That is, the processor 430 performs an operation of reading data from the physical areas of the disk corresponding to the backward prefetch area and the forward prefetch area as well as the first area designated by the read command.

Figure 18:
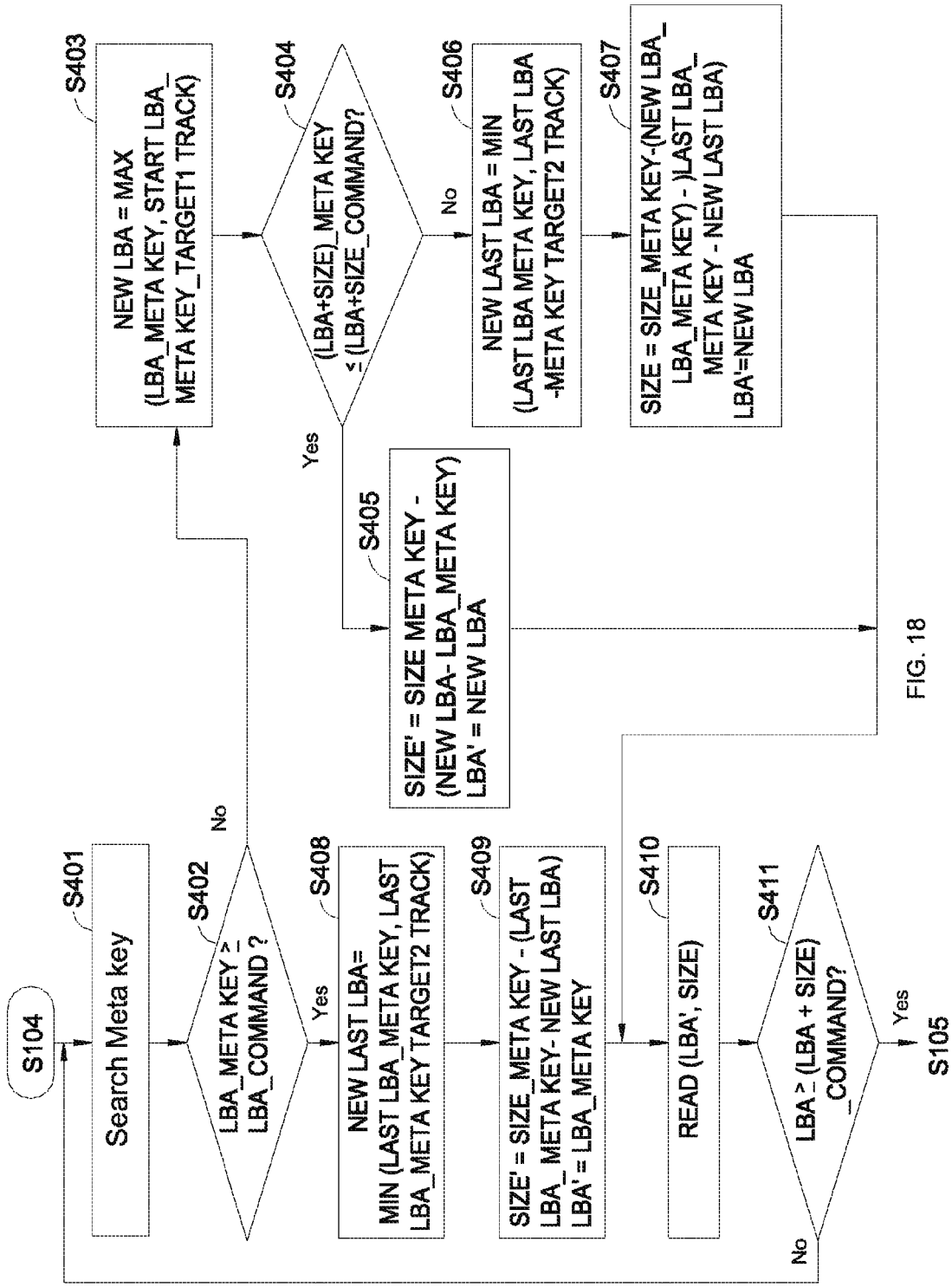
FIG. 18 is a detailed flowchart according to another exemplary embodiment of performing a process of a step S104 illustrated in FIG. 15.

A more detailed embodiment of the step S104 illustrated in FIG. 15 will be described with reference to FIG. 18.

When a cache hit has not been generated, the processor 430 searches for a meta key META KEY, which corresponds to addresses from a start position address to an end position address of a first area designated by (LBA, SIZE) included in a read command, from the address mapping information 470-1 (S401). Accordingly, the processor 430 starts searching from a meta key corresponding to LBA_COMMAND.

The processor 430 compares LBA_META KEY as START LBA of the meta key searched at the step S401 with LBA_COMMAND as START LBA of the read command (S402).

When LBA_META KEY value is smaller than LBA_COMMAND VALUE according to the comparison result of the step S402, the processor 430 decides, as NEW LBA, LBA having a greater value, of LBA_META KEY and START LBA_META KEY_TARGET1 TRACK, which is START LBA accessible by META KEY searched within a track, to which VA corresponding to LBA_COMMAND is allocated (S403).

After performing the step S403, the processor 430 compares (LBA+SIZE)_META KEY value with (LBA+SIZE)_COMMAND value (S404).

When (LBA+SIZE)_META KEY value is greater than (LBA+SIZE)_COMMAND value according to the comparison result of the step S404, the processor 430 decides a smaller value of LAST LBA_META KEY value and LAST LBA_META KEY_TARGET2 TRACK value as NEW LAST LBA (S406). Here, LAST LBA_META KEY indicates the last LBA value of LBA area designated by the searched meta key, and LAST LBA_META KEY_TARGET2 TRACK indicates the last LBA value accessible by META KEY searched within the track to which VA corresponding to (LBA+SIZE−1)_COMMAND is allocated.

Next, the processor 430 decides LBA' as a start LBA value desired to be read from the disk 12 and SIZE' as a size of an area to be read, as expressed by Equation 2 (S407).

When LBA_META KEY value is greater than or equal to the LBA_COMMAND value according to the comparison result of the step S402, the processor 430 decides, as NEW LAST LBA, LBA having a smaller value of LAST LBA_META KEY as the last LBA designated by the searched META KEY and LAST LBA_META KEY_TARGET2 TRACK as the last LBA accessible by the META KEY searched within a track to which VA corresponding to (LBA+SIZE−1)_COMMAND is allocated (S408).

The processor 430 decides LBA' as a start LBA area desired to be read from the disk 12 and SIZE' as a size of an area to be read, as expressed by Equation 3 (S409).

The processor 430 then read data from a physical address of the disk 12 corresponding to the LBA area designated by (LBA', SIZE') decided at the step S405, S407 or S409 (S410).

The processor 430 compares the next LBA after completion of the read operation with (LBA+SIZE)_COMMAND (S411).

When the next LBA value after completion of the read operation is smaller than (LBA+SIZE)_COMMAND according to the comparison result of the step S411, the process goes back to the step S401. That is, this case re-performs operations from the process of searching for the meta key corresponding to the next LBA after completion of the read operation.

When the next LBA value after completion of the read operation is greater than or equal to (LBA+SIZE)_COMMAND according to the comparison result of the step S411, it corresponds to all the data for the area designated by the read command being read based on the searched meta key. Therefore, the step S104 is terminated, and the step S105 illustrated in FIG. 15 is performed.

Referring to FIG. 15 again, the processor 430 stores the data read from the disk 12 at the step S104 in the area of the cache buffer 470-2 (S105).

The processor 430 then reads data for the LBA area designated by the read command from the area of the cache buffer 470-2 (S106). The processor 430 transmits the read data to the host device (S107).

Figure 19:
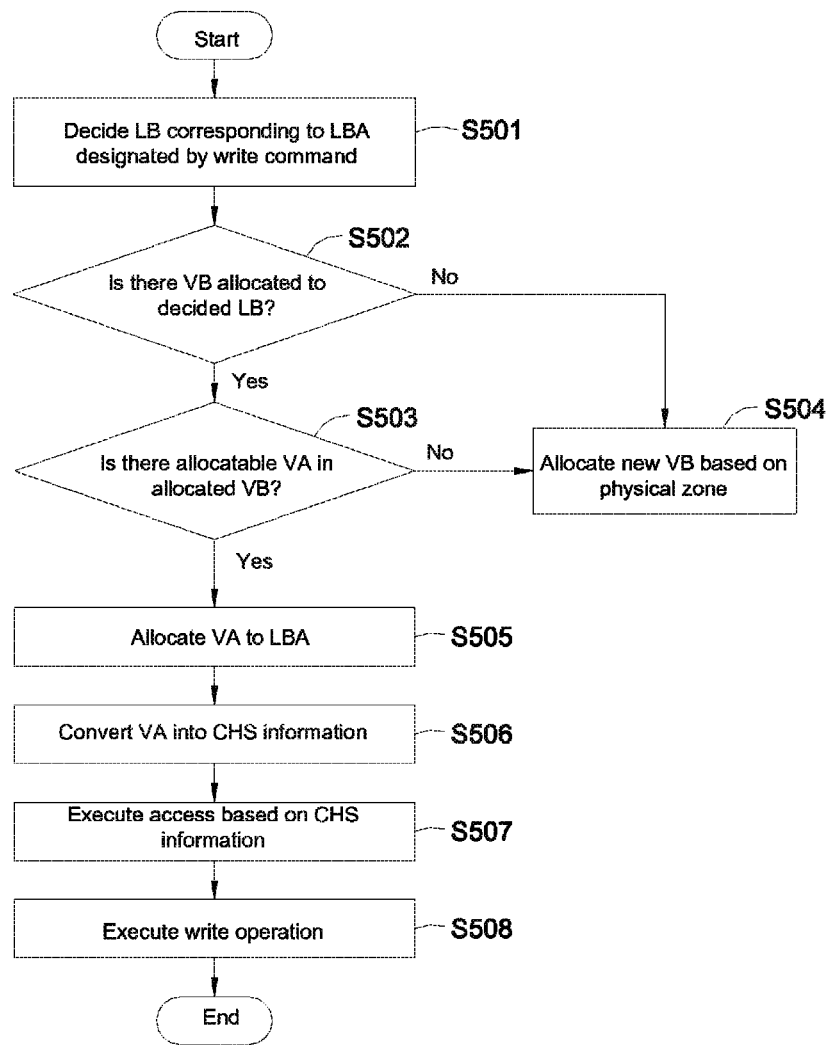
FIG. 19 is a flowchart illustrating a data writing method performed in a storage device in accordance with one exemplary embodiment.

Hereinafter, a process of performing a write operation in the disk drive of FIGS. 4A and 4B as one example of the data storage device will be described in detail with reference to FIG. 19.

The processor 430 decides a Logical Band (LB) corresponding to LBA desired to be written according to a received write command (S501). In detail, the processor 430 decides a logical band corresponding to LBA desired to be written using a logical band number, which includes the LBA desired to be written. For example, if a logical band number 0 is allocated with LBA 0~999, and the LBA desired to be written is 75, the logical band corresponding to the LBA desired to be written is decided as a logical band number 0.

The processor 430 determines whether or not there is a virtual band allocated to the logical band decided at the step S501 (S502). In detail, the processor 430 searches for the address mapping information 470-1 stored in the RAM 470, and determines whether or not there is a virtual band allocated to the logical band decided at the step S501.

When there is the virtual band allocated to the logical band decided at the step S501 according to the determination result of the step S502, the processor 430 determines whether or not an allocatable virtual address (VA) is present in the allocated virtual band (S503). That is, the processor 430 determines whether or not any allocatable virtual address is left in the allocated virtual band. When the last accessed virtual address in the allocated virtual band is a virtual address corresponding to the last sector included in the virtual band, it is determined that any allocatable virtual address is not left. For example, if a size of a virtual band is 200 sectors and a start virtual address is set to 0~199, when the last accessed virtual address is 199, it may be determined that all the virtual addresses have been allocated in the corresponding virtual band.

When there is no virtual band allocated to the logical band decided at the step S501 according to the determination result of the step S502 or there is no allocatable virtual address in the allocated virtual band according to the determination result of the step S503, the processor 430 allocates a new virtual band to the logical band decided at the step S501 based on a physical zone (S504). That is, the processor 430 may allocate a virtual band, which has not been allocated to another logical band, among virtual bands included in the physical zone corresponding to the logical band including the LBA desired to be written, to the logical band including the LBA desired to be written.

The processor 430 then allocates a virtual address (VA) corresponding to the LBA desired to be written based on the allocated virtual band (S505). In detail, when the new virtual address has been allocated at the step S504, the processor 430 may allocate a start virtual address, which indicates a first sector of the newly allocated virtual band, to LBA designated by a command. Also, when a virtual address allocatable to LBA is present in the virtual band already allocated to the logical band, the processor 430 may allocate the next virtual address consecutive to the virtual address, which is last accessed in the virtual band, to the LBA designated by the command. The processor 430 generates mapping information using one meta key on an area where LBA and VA are sequentially increasing together.

The processor 430 converts the virtual address allocated at the step S505 into Cylinder Head Sector (CHS) information corresponding to physical access position information related to the disk 12 (S506).

The processor 430 then performs a seek operation based on the CHS information corresponding to the physical access position information converted at the step S506 (S507). In detail, the processor 430 generates a VCM driving control signal for moving the magnetic head 16 to a target track position of the disk 12 according to the converted CHS information. Referring to FIGS. 4A and 4B, when the generated VCM driving control signal is applied to the VCM driving unit 440, the VCM driving unit 440 generates a VCM driving current corresponding to the VCM driving control signal to supply to the VCM 30. Accordingly, the magnetic head 16 is moved to a position of a track and sector of the disk desired to access.

After completing the seek operation of the step S507, the processor 430 writes data on a sector position corresponding to VA of the disk 12 (S508).

Hereinafter, a prefetch management method in a data read operation through a network in accordance with one exemplary embodiment will be described.

First, a network system for performing a prefetch management in the data read operation via a network will be described with reference to FIG. 30.

Figure 30:
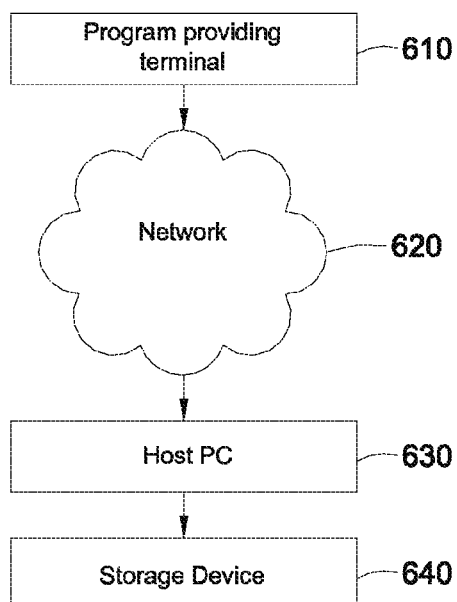
FIG. 30 is a network configuration view illustrating a prefetch management method in a data read operation through a network in accordance with one exemplary embodiment.

As illustrated in FIG. 30, a network system in accordance with one exemplary embodiment of the present disclosure may include a program providing terminal 610, a network 620, a host PC 630, and a storage device 640.

The network 620 may be implemented as a communication network such as an Internet or the like. Alternatively, the network 620 may be implemented as a wireless communication network as well as a wired communication network.

The program providing terminal 610 may store a prefetch management program for performing operations according to the flowcharts illustrated in FIGS. 15 to 18.

The program providing terminal 610 may perform a process of transmitting the prefetch management program to the host PC 630 according to a program transmission request by the host PC 630, which is connected thereto via the network 620.

The host PC 630 may include hardware and software for requesting for transmission of the prefetch management program after being connected to the program providing terminal 610 via the network 620, and downloading the requested prefetch management program from the program providing terminal 610.

The host PC 630 may execute the prefetch management method in the data read operation according to the present disclosure based on the flowcharts illustrated in FIGS. 15 to 18 by the prefetch management program downloaded from the program providing terminal 610.

Figure 31:
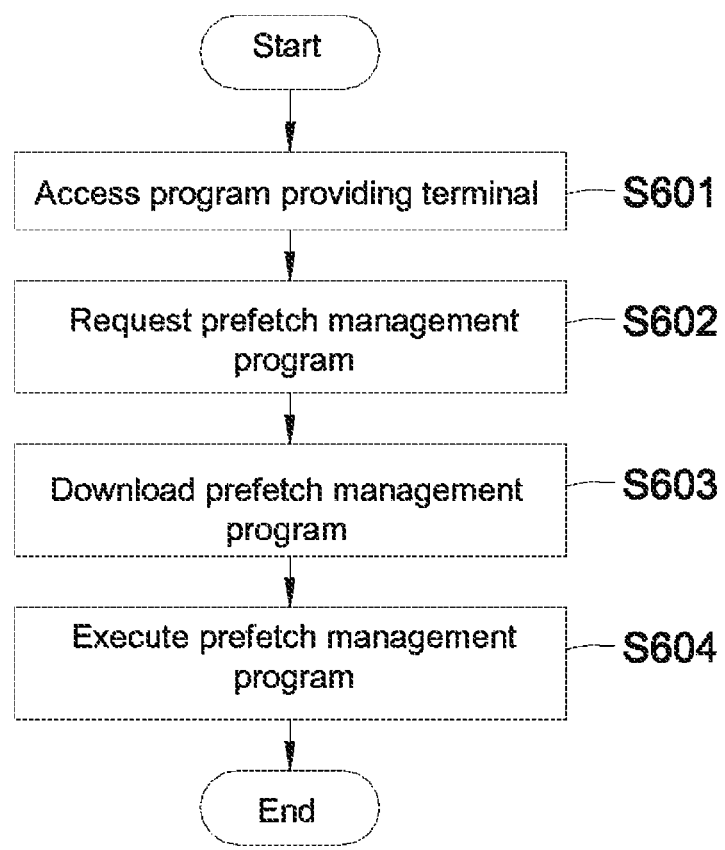
FIG. 31 is a flowchart illustrating a prefetch management method in a data read operation via a network in accordance with one exemplary embodiment.

Hereinafter, description will be given of the prefetch management method in the data read operation through a network in accordance with the one exemplary embodiment with reference to the flowchart of FIG. 31.

First, the host PC 630 using the storage device 640 such as a disk drive accesses the program providing terminal 610 via the network 620 (S601).

After access to the program providing terminal 610, the host PC 630 transmits information for requesting for transmission of a prefetch management program to the program providing terminal 610 (S602).

The program providing terminal 610 transmits the requested prefetch management program to the host PC 630, and accordingly the host PC 630 downloads the prefetch management program (S603).

Afterwards, the host PC 630 processes the downloaded prefetch management program to be executed on the storage device (S604). As the prefetch management program is executed on the storage device, the methods according to FIGS. 15 to 18 can be executed.

A disk drive using a dynamic address conversion writes data to a virtual band number 0 such that LBA ad VA are mapped.

Then, as one example, when a read command for reading LBA 10 is transferred to the disk drive, the disk drive according to the present disclosure performs a prefetch operation within a range of a meta key so as to read only data stored in LBA 10. When (LBA, SIZE) designated by the read command is set to (10, 1), only the data stored in a sector corresponding to LBA 10 is read without performing the prefetch operation.

That is, since LBA is discontinuous on a sector adjacent to LBA 10, it can be understood that a meta key (LBA, SIZE, VA) corresponding to LBA 10 is (10, 1, 15), and data is read from a sector of a disk corresponding to VA 15 according to the meta key.

The present disclosure may be applied to a storage device using various writing schemes as well as a disk drive using a shingled write.

In some embodiments, a method for reading data may comprise: searching a meta key corresponding to an address included in a first area designated by a read command from address mapping information; and reading data from a storage medium based on the searched meta key, wherein a prefetch operation according to the read command is performed within a range of a second area designated by the searched meta key. The embodiment may include, wherein the prefetch operation comprises a backward prefetch operation for reading a forward portion of the first area and a forward prefetch operation for reading a backward portion of the first area while performing the read command. The embodiment may include, wherein the backward prefetch operation is performed within a range of a third area designated by a meta key corresponding to a start position address of the first area. The embodiment may include, wherein the forward prefetch operation is performed within a range of a fourth area designated by a meta key corresponding to an end position address of the first area. The embodiment may include, wherein the prefetch operation is performed from a start logical block address having a greater value, of a second start logical block address designated by a meta key corresponding to a first start logical block address designated by the read command and a third start logical block address accessible by the meta key corresponding to the first logical block address within a track of a storage medium corresponding to the first start logical block address. The embodiment may include, wherein the prefetch operation is performed up to a logical block address having the greatest value allocated within a track of the storage medium corresponding to a last logical block address of the first area designated by the read command, among logical block addresses included in a fourth area designated by a meta key corresponding to the last logical block address of the first area designated by the read command.

In some embodiments a storage device may comprise: a storage medium;

a storage medium interface to allow for data write or data read by accessing the storage medium; a memory device to store address mapping information, the address mapping information including meta keys indicating a physical address of the storage medium mapped to a logical block address; and a processor to control the storage medium interface to write data to the storage medium or read data from the storage medium, wherein the processor searches for a meta key corresponding to an address included in a first area designated by a read command from the memory device and execute a prefetch operation according to the read command within a range of a second area designated by the searched meta key. The embodiment may include, wherein the processor executes a backward prefetch operation for reading a forward portion of the first area from a second start logical block address, the second start logical block address being designated by a meta key corresponding to a first start logical block address designated by the read command, while executing the read command, in case where the second start logical block address is included in a track of the storage medium corresponding to the first start logical block address. The embodiment may include, wherein the processor executes a backward prefetch operation for reading a forward portion of the first area from a third start logical block address, which is accessible by a meta key corresponding to a first start logical block address within a track of the storage medium corresponding to the first start logical block address designated by the read command, in case where a second start logical block address designated by a meta key corresponding to the first start logical block address is not included in a track of the storage medium corresponding to the first start logical block address. The embodiment may include, wherein the processor executes a forward prefetch operation for reading a backward portion of the first area up to a logical block address having the greatest value, the logical block address being accessible on a track of the storage medium corresponding to the last logical block address of the first area designated by the read command, among logical block addresses accessible by a meta key corresponding to the last logical block address of the first area designated by the read command.

The present disclosure may be executed as a method, an apparatus, a system and the like. When being executed as software, components of the present disclosure may be code segments for executing necessary tasks. Programs or code segments may be stored in a program-readable medium. Examples of the program-readable medium may include an electronic circuit, a semiconductor memory device, ROM, a flash memory, an Erasable ROM (EROM), a floppy disk, an optical disk, a hard disk and the like.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
receiving a read request at a data storage device;
consulting an address map representing data stored to the data storage device, wherein consecutive sequential logical block addresses (LBAs) stored on a data storage medium of the data storage device are represented on the address map as meta keys, each meta key including a beginning LBA and a size field corresponding to a number of consecutive sequential LBAs;
determining if a logical block address of the read request is included in a range of a first meta key;
calculating a prefetch operation to prefetch data from the data storage medium based on the logical block address of the read request and a logical block address defined in the first meta key;
reading data corresponding to the prefetch operation and the read request from the data storage medium; and
storing the data corresponding to the prefetch operation and the read request to a cache memory.

2. The method of claim 1, further comprising the first meta key's range includes a start logical block address of the read request, and the prefetch operation includes a backwards prefetch that prefetches logical block addresses from the beginning logical block address of the first meta key up to the start logical block address of the read request.

3. The method of claim 1, further comprising the data storage medium includes a disc memory, the first meta key's range includes a start logical block address of the read request, and the prefetch operation includes a backwards prefetch that prefetches logical block addresses starting from the later of the beginning logical block address of the first meta key and a first logical block address stored on a same disc track as the start logical block address of the read request, up to the start logical block address of the read request.

4. The method of claim 1, further comprising the first meta key's range includes an end logical block address of the read request, and the prefetch operation includes a forwards prefetch that reads logical block addresses from the end logical block address of the read request up to a last logical block address of the first meta key.

5. The method of claim 1, further comprising the data storage medium includes a disc memory, the first meta key's range includes an end logical block address of the read request, and the prefetch operation includes a forwards prefetch that reads logical block addresses from the end logical block address of the read request up to the earlier of a last logical block address of the first meta key and a last logical block address on a same disc track as the end logical block address of the read request.

6. The method of claim 1, further comprising: the data storage medium includes a disc memory and the first meta key's range includes a start logical block address of the read request;
   determining if an end logical block address of the read request is included in a range of a second meta key in the address map, wherein the first meta key and the second meta key may be the same meta key when all logical block addresses of the read request are included in the meta key;
   the prefetch operation includes a backwards prefetch and a forwards prefetch, the backwards prefetch includes prefetching logical block addresses starting from the later of the beginning logical block address of the first meta key and a first logical block address stored on a same disc track as the start address of the read request, up to the start logical block address of the read request and the forwards prefetch comprises reading logical block addresses from the end logical block address of the read request up to the earlier of a last logical block address of the second meta key and a last logical block address on a same disc track as the end logical block address of the read request.

7. The method of claim 1, further comprising the first meta key includes a virtual address corresponding to the beginning logical block address, and the virtual address is mapped to a first physical address of a data storage medium corresponding to a sequential set of physical addresses of a size equal to the size field.

8. The method of claim 1 further comprising prefetching includes reading data from a nonvolatile storage medium of the data storage device without receiving a read request for the data from a host, and storing the data in the cache memory.

9. The method of claim 1, further comprising downloading a program including instructions for executing the method through a network connection.

10. An apparatus comprising
   a memory device storing instructions that when executed by a computer cause the computer to perform a method comprising:
   receiving a read request at a data storage device;
   consulting an address map representing data stored to the data storage device, wherein consecutive sequential logical block addresses (LBAs) stored on a data storage medium of the data storage device are represented on the address map as meta keys, each meta key including a beginning LBA and a size field corresponding to a number of consecutive sequential LBAs;
   determining if a logical block address of the read request is included in a range of a first meta key;
   calculating a prefetch operation to prefetch data from the data storage medium based on the logical block address of the read request and a logical block address defined in the first meta key;
   reading data corresponding to the prefetch operation and the read request from the data storage medium; and
   storing the data corresponding to the prefetch operation and the read request to a cache memory.

11. The apparatus of claim 10, further comprising the memory device includes a disc memory, the first meta key's range includes a start logical block address of the read request, and the prefetch operation includes a backwards prefetch that prefetches logical block addresses starting from the later of the beginning logical block address of the first meta key and a first logical block address stored on a same disc track as the start logical block address of the read request, up to the start logical block address of the read request.

12. The apparatus of claim 10, further comprising the data storage medium includes a disc memory, the first meta key's range includes an end logical block address of the read request, and the prefetch operation includes a forwards prefetch that reads logical block addresses from the end logical block address of the read request up to the earlier of a last logical block address of the first meta key and a last logical block address on a same disc track as the end logical block address of the read request.

13. The apparatus of claim 10, further comprising:
   the memory device includes a disc memory and the first meta key's range includes a start logical block address of the read request, and the method further includes:
   determining if an end logical block address of the read request is included in a range of a second meta key in the address map, wherein the first meta key and the second meta key may be the same meta key when all logical block addresses of the read request are included in the meta key;
   the prefetch operation includes a backwards prefetch and a forwards prefetch, the backwards prefetch includes prefetching logical block addresses starting from the later of the beginning logical block address of the first meta key and a first logical block address stored on a same disc track as the start logical block address of the read request, up to the start logical block address of the read request, and the forwards prefetch includes reading logical block addresses from the end logical block address of the read request up to the earlier of a last logical block address of the second meta key and a last logical block address on a same disc track as the end logical block address of the read request.

14. An apparatus comprising:
   a processor configured to:
   receive a read request to retrieve data from a nonvolatile storage memory;
   consulting an address map representing data stored to the nonvolatile storage memory, wherein consecutive sequential logical block addresses (LBAs) are represented on the address map as meta keys, each meta key including a beginning LBA and a size field corresponding to a number of consecutive sequential LBAs;
   determine if a start logical block address of the read request is included in a range of a first meta key and if an end logical block address of the read request is included in a range of a second meta key;
   calculate a prefetch operation to prefetch data from the nonvolatile storage memory based on the logical block address of the read request, a logical block address defined in the first meta key, and a logical block address defined in the second meta key; and
   read data corresponding to the prefetch operation and the read request from the nonvolatile storage medium; and
   store the data corresponding to the prefetch operation and the read request to a cache memory.

15. The apparatus of claim 14 further comprising:
   a data storage device including:
   the processor;
   a host interface to receive read requests from a host, the host including a network interface; and
   the data storage device is configured to retrieve a set of instructions over the network interface via the host, wherein the instructions, when executed by the processor, control the operation of the data storage device.

16. The apparatus of claim 14, further comprising the processor configured to:
- determine whether the logical block addresses of the read request are in the cache memory;
- determine whether the logical block addresses of the read request are within the range of the first meta key and the range of the second meta key only when the logical block addresses of the read request are not in the cache memory; and
- return the data responsive to the read request.

17. The apparatus of claim 14, further comprising the non-volatile storage medium includes a disc memory, and the prefetch operation includes a backwards prefetch and a forwards prefetch, the backwards prefetch includes prefetching logical block addresses starting from the later of a beginning logical block address of the first meta key and a first logical block address stored on a same disc track as the start logical block address of the read request, up to the start logical block address of the read request, and the forwards prefetch includes reading logical block addresses from the end logical block address of the read request up to the earlier of a last logical block address of the second meta key and a last logical block address on a same disc track as the end logical block address of the read request.

18. The apparatus of claim 17, further comprising data is recorded on the disc memory in a shingled writing fashion such that data is written in one direction across a portion of the disc and data on disc track N+1 partially overwrites data on disc track N.

19. The apparatus of claim 14, further comprising the non-volatile storage medium includes a disc memory, and the prefetch operation includes a backwards prefetch that prefetches logical block addresses starting from the later of the beginning logical block address of the first meta key and a first logical block address stored on a same disc track as the start address of the read request, up to the start logical block address of the read request.

20. The apparatus of claim 14, further comprising the non-volatile storage medium includes a disc memory, and the prefetch operation includes a forwards prefetch that reads logical block addresses from the end logical block address of the read request up to the earlier of a last logical block address of the second meta key and a last logical block address on a same disc track as the end logical block address of the read request.

* * * * *